US012148183B2

(12) United States Patent
Evans et al.

(10) Patent No.: US 12,148,183 B2
(45) Date of Patent: Nov. 19, 2024

(54) DETERMINING A CURRENT POSE ESTIMATE OF AN AIRCRAFT RELATIVE TO A RUNWAY TO SUPPORT THE AIRCRAFT ON APPROACH

(71) Applicant: The Boeing Company, Chicago, IL (US)

(72) Inventors: Nick S. Evans, Lynnwood, WA (US); Eric R. Muir, Bothell, WA (US); Cullen W. Billhartz, Seattle, WA (US); Jasper P. Corleis, Renton, WA (US)

(73) Assignee: The Boeing Company, Arlington, VA (US)

( * ) Notice: Subject to any disclaimer, the term of this patent is extended or adjusted under 35 U.S.C. 154(b) by 454 days.

(21) Appl. No.: 17/527,783

(22) Filed: Nov. 16, 2021

(65) Prior Publication Data

US 2022/0198703 A1   Jun. 23, 2022

Related U.S. Application Data

(60) Provisional application No. 63/127,526, filed on Dec. 18, 2020.

(51) Int. Cl.
*G06T 7/73* (2017.01)
*G06T 3/40* (2024.01)
*G08G 5/02* (2006.01)

(52) U.S. Cl.
CPC .................. *G06T 7/74* (2017.01); *G06T 3/40* (2013.01); *G08G 5/025* (2013.01);
(Continued)

(58) Field of Classification Search
CPC ............. G06T 7/70; G06T 2207/30244; G06T 2207/20081; G06T 7/74; G06T 3/40;
(Continued)

(56) References Cited

U.S. PATENT DOCUMENTS

2016/0139603 A1\*   5/2016   Bianchi ................. G01S 19/396
701/4
2019/0347943 A1\*  11/2019   Pesik ..................... G08G 5/0021
(Continued)

FOREIGN PATENT DOCUMENTS

CN   107833249 A  \*  3/2018   ............ G06T 7/207
CN   109341686 A  \*  2/2019   ............ G01C 11/00

OTHER PUBLICATIONS

Bicer et al., "Vision-based UAV Guidance for Autonomous Landing with Deep Neural Networks" (Year: 2019).\*
(Continued)

*Primary Examiner* — Dung Hong
(74) *Attorney, Agent, or Firm* — Alleman Hall & Tuttle LLP

(57) ABSTRACT

A method is provided for supporting an aircraft approaching a runway on an airfield. The method includes receiving a sequence of images of the airfield, captured by a camera onboard the aircraft approaching the runway. For at least one image of the sequence of images, the method includes applying the image(s) to a machine learning model trained to predict a pose of the aircraft relative to the runway. The machine learning model is configured to map the image(s) to the pose based on a training set of labeled images with respective ground truth poses of the aircraft relative to the runway. The pose is output as a current pose estimate of the aircraft relative to the runway for use in at least one of monitoring the current pose estimate, generating an alert based on the current pose estimate, or guidance or control of the aircraft on a final approach.

20 Claims, 20 Drawing Sheets

(52) U.S. Cl.
CPC ............... *G06T 2207/10032* (2013.01); *G06T 2207/20081* (2013.01); *G06T 2207/20132* (2013.01); *G06T 2207/20164* (2013.01); *G06T 2207/30204* (2013.01)

(58) Field of Classification Search
CPC . G06T 2207/10032; G06T 2207/20132; G06T 2207/20164; G06T 2207/30204; G08G 5/025
See application file for complete search history.

(56) References Cited

U.S. PATENT DOCUMENTS

| | | | |
|---|---|---|---|
| 2020/0050217 A1* | 2/2020 | Rose | G05D 1/101 |
| 2020/0168111 A1* | 5/2020 | Veyrac | G06F 18/214 |
| 2020/0202559 A1* | 6/2020 | Cramblitt | G05D 1/101 |
| 2020/0312170 A1* | 10/2020 | Sherback | H04L 9/0872 |

OTHER PUBLICATIONS

Matthew et al., "Machine Vision for Airport Runway Identification" (Year: 2015).*

Tremblay, J. et al. Deep Object Pose Estimation for Semantic Robotic Grasping of Household Objects. 2nd Conference on Robot Learning (CoRL 2018), Sep. 27, 2018, Zurich, Switzerland, 11 pages. <arXiv: 1809.10790v1>.

Baldini, F. et al. Learning Pose Estimation for UAV Autonomous Navigation and Landing Using Visual-Inertial Sensor Data. 2020 American Control Conference (ACC), Apr. 9, 2020, USA, 8 pages. <arXiv: 1912.04527v2>.

Amor-Martinez, A. et al. Planar PoP: feature-less pose estimation with applications in UAV localization. 2016 IEEE International Symposium on Safety, Security, and Rescue Robotics (SSRR), 2016, 6 pages. <DOI: 10.1109.SSRR.2016.7784271>.

* cited by examiner

DETERMINING A CURRENT POSE ESTIMATE OF AN AIRCRAFT RELATIVE TO A RUNWAY TO SUPPORT THE AIRCRAFT ON APPROACH

CROSS-REFERENCE TO RELATED APPLICATION(S)

This application claims priority to U.S. Provisional Application No. 63/127,526, filed Dec. 18, 2020, entitled Determining a Current Pose Estimate of an Aircraft Relative to a Runway to Support the Aircraft on Approach, the content of which is incorporated herein by reference in its entirety.

TECHNOLOGICAL FIELD

The present disclosure relates generally to aircraft operation and, in particular, to supporting an aircraft approaching a runway on an airfield.

BACKGROUND

Safe, predictable, and reliable landings are an essential aspect of an effective aircraft-based transportation system. In many situations, piloted aircraft can only land visually in high visibility and clear weather conditions. While external navigation systems, such as instrument landing systems (ILS) and global positioning systems (GPS) may be used in some contexts, some situations require visibility and cloud conditions below a specified decision altitude to permit a pilot to land visually. Even in situations where external systems may be used, those external systems are subject to outages, inaccuracies, and interference, which raise technical challenges to efforts to automate the landing process.

The technical challenges associated with automating landings or automatically generating guidance to assist a pilot during a landing are compounded by multiple factors, such as the variety and variability of weather and visibility conditions, the availability and feasibility specialized equipment at different airfields, and the robustness required of algorithmic approaches to landing operations.

BRIEF SUMMARY

Example implementations of the present disclosure are directed to aircraft operation and, in particular, to supporting an aircraft approaching a runway on an airfield. Example implementations address and overcome technical challenges associated with autonomous approach and landing operations in aircraft using either or both computer vision heuristics or machine learning to determine estimate the pose of the aircraft relative to the runway. Some example implementations are flexible in at least the sense that such example implementations may accommodate a range of passive and active sensors, including but not limited to visual imaging devices, hyperspectral imaging devices, LIDAR, RADAR, and the like, for example, to perceive the landing environment and to determine the aircraft-relative pose, and may be used with a variety of manned and un-manned aircraft of varying size to land on visual, precision, and non-precision runways. Some example implementations are also cost-effective, at least in the sense that such example implementations do not require expensive in-ground infrastructure to be installed at a given airfield.

The present disclosure thus includes, without limitation, the following example implementations.

Some example implementations provide a method of supporting an aircraft approaching a runway on an airfield, the method comprising: receiving a sequence of images of the airfield, captured by a camera onboard the aircraft approaching the runway; and for at least one image of the sequence of images, applying the at least one image to a machine learning model trained to predict a pose of the aircraft relative to the runway, the machine learning model configured to map the at least one image to the pose based on a training set of labeled images with respective ground truth poses of the aircraft relative to the runway; and outputting the pose as a current pose estimate of the aircraft relative to the runway for use in at least one of monitoring the current pose estimate, generating an alert based on the current pose estimate, or guidance or control of the aircraft on a final approach.

In some example implementations of the method of any preceding example implementation, or any combination of any preceding example implementations, applying the at least one image to the machine learning model includes: applying the at least one image to the machine learning model trained to predict a pose of the at least one camera in camera coordinates; and transforming the camera coordinates for the at least one camera to corresponding runway-framed local coordinates and thereby predict the pose of the aircraft relative to the runway.

In some example implementations of the method of any preceding example implementation, or any combination of any preceding example implementations, the at least one image and the labeled images are in a non-visible light spectrum.

In some example implementations of the method of any preceding example implementation, or any combination of any preceding example implementations, the labeled images are mono-channel images, the at least one image is a multi-channel image, and the method further comprises converting the multi-channel image to a mono-channel image that is applied to the machine learning model.

In some example implementations of the method of any preceding example implementation, or any combination of any preceding example implementations, the method further comprises cropping the at least one image to reduce a field of view of the at least one camera, and magnifying only a portion of the at least one image on which the runway is located, before the at least one image is applied to the machine learning model.

In some example implementations of the method of any preceding example implementation, or any combination of any preceding example implementations, the method further comprises generating the training set of labeled images, including at least: receiving earlier images of the airfield, captured by the at least one camera onboard the aircraft or a second aircraft approaching the runway, and the respective ground truth poses of the aircraft or the second aircraft relative to the runway; and labeling the earlier images with the respective ground truth poses of the aircraft to generate the training set of labeled images.

In some example implementations of the method of any preceding example implementation, or any combination of any preceding example implementations, the method further comprises generating the training set of labeled images, including at least: executing a flight simulator configured to artificially re-create flight of the aircraft approaching the runway on the airfield; capturing synthetic images of the airfield, and determining the respective ground truth poses of the aircraft relative to the runway, from the flight simulator; and labeling the synthetic images with the respective ground truth poses of the aircraft to generate the training set of labeled images.

In some example implementations of the method of any preceding example implementation, or any combination of any preceding example implementations, applying the at least one image to the machine learning model includes applying the at least one image to machine learning models trained to predict respective components of the pose of the aircraft relative to the runway, the machine learning models configured to determine values of the components and thereby the pose of the aircraft relative to the runway.

In some example implementations of the method of any preceding example implementation, or any combination of any preceding example implementations, applying the at least one image to the machine learning model includes applying the at least one image to machine learning models trained to predict multiple current pose estimates according to different algorithms, and the method further comprises: determining confidence intervals associated with respective ones of the multiple current pose estimates; and performing a sensor fusion of the multiple current pose estimates using the confidence intervals to determine the current pose estimate of the aircraft relative to the runway.

Some example implementations provide a method of supporting an aircraft approaching a runway on an airfield, the method comprising: receiving a sequence of images of the airfield, captured by at least one camera onboard the aircraft approaching the runway; and for at least an image of the sequence of images, performing an object detection and segmentation in which at least one of the runway on the airfield, or a runway marking on the runway, is detected in the image, and in which a mask is produced that includes a segment of pixels of the image assigned to an object class for the runway or the runway marking; determining a current pose estimate of the aircraft relative to the runway or the runway marking based on the mask; and outputting the current pose estimate for use in at least one of monitoring the current pose estimate, generating an alert based on the current pose estimate, or guidance or control of the aircraft on a final approach.

In some example implementations of the method of any preceding example implementation, or any combination of any preceding example implementations, determining the current pose estimate of the aircraft relative to the runway or the runway marking includes at least: determining the current pose estimate of the at least one camera in camera coordinates; and transforming the camera coordinates for the at least one camera to corresponding runway-framed local coordinates that are output for use in the at least one of monitoring the current pose estimate, generating the alert based on the current pose estimate, or guidance or control of the aircraft.

In some example implementations of the method of any preceding example implementation, or any combination of any preceding example implementations, the sequence of images are in the non-visible light spectrum.

In some example implementations of the method of any preceding example implementation, or any combination of any preceding example implementations, the image is a multi-channel image, and the method further comprises converting the multi-channel image to a mono-channel image on which the object detection and segmentation is performed.

In some example implementations of the method of any preceding example implementation, or any combination of any preceding example implementations, the method further comprises cropping the image to reduce a field of view of the at least one camera, and magnifying only a portion of the image on which the runway or the runway marking is located, before the object detection and segmentation is performed.

In some example implementations of the method of any preceding example implementation, or any combination of any preceding example implementations, the method further comprises: accessing an earlier image in the sequence of images, and an earlier mask includes a respective segment of pixels of the earlier image assigned to the object class for the runway or the runway marking; and identifying a portion of the earlier image that frames the earlier mask, and thereby the portion of the airfield on which the runway or the runway marking is located, and wherein cropping the image includes cropping the image to a portion of the image that corresponds to the portion of the earlier image.

In some example implementations of the method of any preceding example implementation, or any combination of any preceding example implementations, performing the object detection and segmentation includes applying the image to a machine learning model trained to perform the object detection and segmentation.

In some example implementations of the method of any preceding example implementation, or any combination of any preceding example implementations, performing the object detection and segmentation includes performing a feature detection in which features of the runway or the runway marking are detected in the image, and in which the mask is produced from the features.

In some example implementations of the method of any preceding example implementation, or any combination of any preceding example implementations, determining the current pose estimate includes at least: applying the mask to a corner detector to detect interest points on the mask and thereby the runway or the runway marking in the image; matching the interest points on the runway or the runway marking in the image, to corresponding points on the runway or the runway marking that have known runway-framed local coordinates; and performing a perspective-n-point (PnP) estimation, using the interest points and the known runway-framed local coordinates, to determine the current pose estimate of the at least one camera and thereby the aircraft relative to the runway or the runway marking.

In some example implementations of the method of any preceding example implementation, or any combination of any preceding example implementations, performing the object detection and segmentation includes applying the image to a machine learning model trained to perform the object detection and segmentation, and the method further comprises and the method further comprises: determining an operational state of the aircraft; and based on the operational state, selecting a first machine learning model or a second machine learning model as the machine learning model to which the image is applied, the first machine learning model trained to perform a one-class object detection and segmentation, and the second machine learning model trained to perform a multi-class object detection and segmentation.

In some example implementations of the method of any preceding example implementation, or any combination of any preceding example implementations, performing the object detection and segmentation includes applying the image to a machine learning model trained to perform the object detection and segmentation, and the machine learning model further determines a confidence interval or multi-dimensional confidence matrix associated with detection of the runway or the runway marking, and wherein the method further comprises applying the mask to a confidence filter that passes the mask to the corner detector only when the confidence interval is above a threshold confidence interval that is dynamically set based on an operational state of the aircraft.

In some example implementations of the method of any preceding example implementation, or any combination of any preceding example implementations, the PnP estimation is performed to determine to multiple current pose estimates of the aircraft relative to the runway or the runway marking, and the method further comprises: determining confidence intervals associated with respective ones of the multiple current pose estimates; and performing a sensor fusion of the multiple current pose estimates using the confidence intervals to determine the current pose estimate of the aircraft relative to the runway or the runway marking.

In some example implementations of the method of any preceding example implementation, or any combination of any preceding example implementations, the object detection and segmentation is performed to detect the runway, and in which the mask includes the segment of pixels of the image assigned to the object class for the runway, and determining the current pose estimate includes at least: applying the mask to a corner detector to detect a pair of interest points on the mask and thereby the runway in the image; matching the pair of interest points on the runway in the image, to corresponding points on the runway that have known runway-framed local coordinates; and performing a perspective-n-point (PnP) estimation for n=2, using the pair of interest points and the known runway-framed local coordinates, to determine the current pose estimate of the at least one camera and thereby the aircraft relative to the runway, the PnP estimation modified based on an assumption that the runway is rectangular and planar, and wherein the PnP estimation is performed as modified to determine the current pose estimate including two degrees-of-freedom (DOF) made up of a vertical angular deviation of the aircraft from a glideslope, and a lateral angular deviation of the aircraft from a centerline of the runway.

In some example implementations of the method of any preceding example implementation, or any combination of any preceding example implementations, the object detection and segmentation is performed to detect the runway, and in which the mask includes the segment of pixels of the image assigned to the object class for the runway, and determining the current pose estimate includes at least: performing a parameterization of the mask in which a shape of the mask is described by values of at least one of a set of parameters or an interpolation of the set of parameters; and determining a current pose estimate of the aircraft relative to the runway based on the values of the set of parameters and an expression that maps the at least one of the set of parameters or the interpolation of the set of parameters to a pose or an interpolated pose of the aircraft relative to the runway.

In some example implementations of the method of any preceding example implementation, or any combination of any preceding example implementations, the set of parameters includes moment invariants of the mask, and performing the parameterization includes determining values of the moment invariants of the mask.

In some example implementations of the method of any preceding example implementation, or any combination of any preceding example implementations, the current pose estimate is determined based on the expression that is implemented as a lookup table of different values of the set of parameters and ground truth poses of the aircraft relative to the runway.

In some example implementations of the method of any preceding example implementation, or any combination of any preceding example implementations, the current pose estimate is determined based on the expression that is implemented as a stochastic algorithm.

In some example implementations of the method of any preceding example implementation, or any combination of any preceding example implementations, the current pose estimate is determined based on the expression that is implemented as a deterministic algorithm.

In some example implementations of the method of any preceding example implementation, or any combination of any preceding example implementations, the object detection and segmentation is performed to detect the runway, and in which the mask includes the segment of pixels of the image assigned to the object class for the runway, and determining the current pose estimate includes at least: determining edges of the mask that correspond to sides of the runway, and values of spatial dimensions of the edges; and performing a regression analysis in which a pose of the aircraft relative to the runway is expressed as a function of parameters that describe spatial dimensions of the edges, the regression analysis performed to determine the current pose estimate of the aircraft relative to the runway from the values of the spatial dimensions of the edges.

In some example implementations of the method of any preceding example implementation, or any combination of any preceding example implementations, performing the regression analysis includes performing the regression analysis in which components of the pose of the aircraft are expressed as respective functions of parameters that describe the spatial dimensions of the edges, the regression analysis performed to determine values of the components and thereby the current pose estimate of the aircraft relative to the runway.

In some example implementations of the method of any preceding example implementation, or any combination of any preceding example implementations, performing the regression analysis includes: performing the regression analysis of different statistical models to determine multiple current pose estimates of the aircraft relative to the runway from the values of the spatial dimensions of the edges; determining confidence intervals associated with respective ones of the multiple current pose estimates; and performing a sensor fusion of the multiple current pose estimates using the confidence intervals to determine the current pose estimate of the aircraft relative to the runway.

In some example implementations of the method of any preceding example implementation, or any combination of any preceding example implementations, the object detection and segmentation is performed to detect the runway, and in which the mask includes the segment of pixels of the image assigned to the object class for the runway, and determining the current pose estimate includes at least: determining edges of the mask that correspond to sides of the runway, and angular deviations of the edges from a centerline of the image; and determining the current pose estimate of the aircraft relative to the runway from the edges and the angular deviations of the edges from the centerline, the current pose estimate including two degrees-of-freedom (DOF) made up of a vertical angular deviation of the aircraft from a glideslope, and a lateral angular deviation of the aircraft from a centerline of the runway.

Some example implementations provide an apparatus for supporting an aircraft approaching a runway on an airfield, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for supporting an aircraft approaching a runway on an airfield, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 5A:
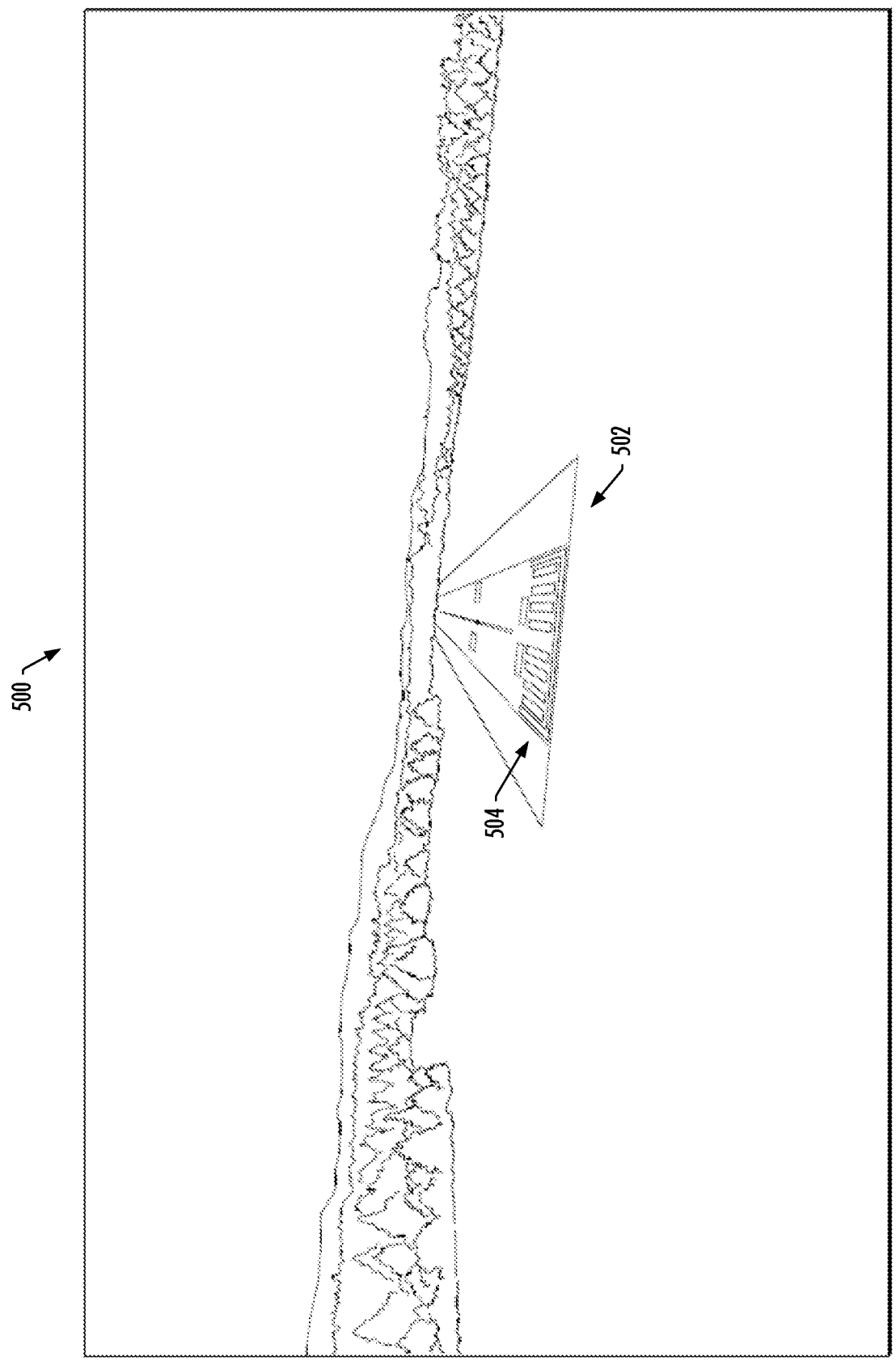
Figure 5B:
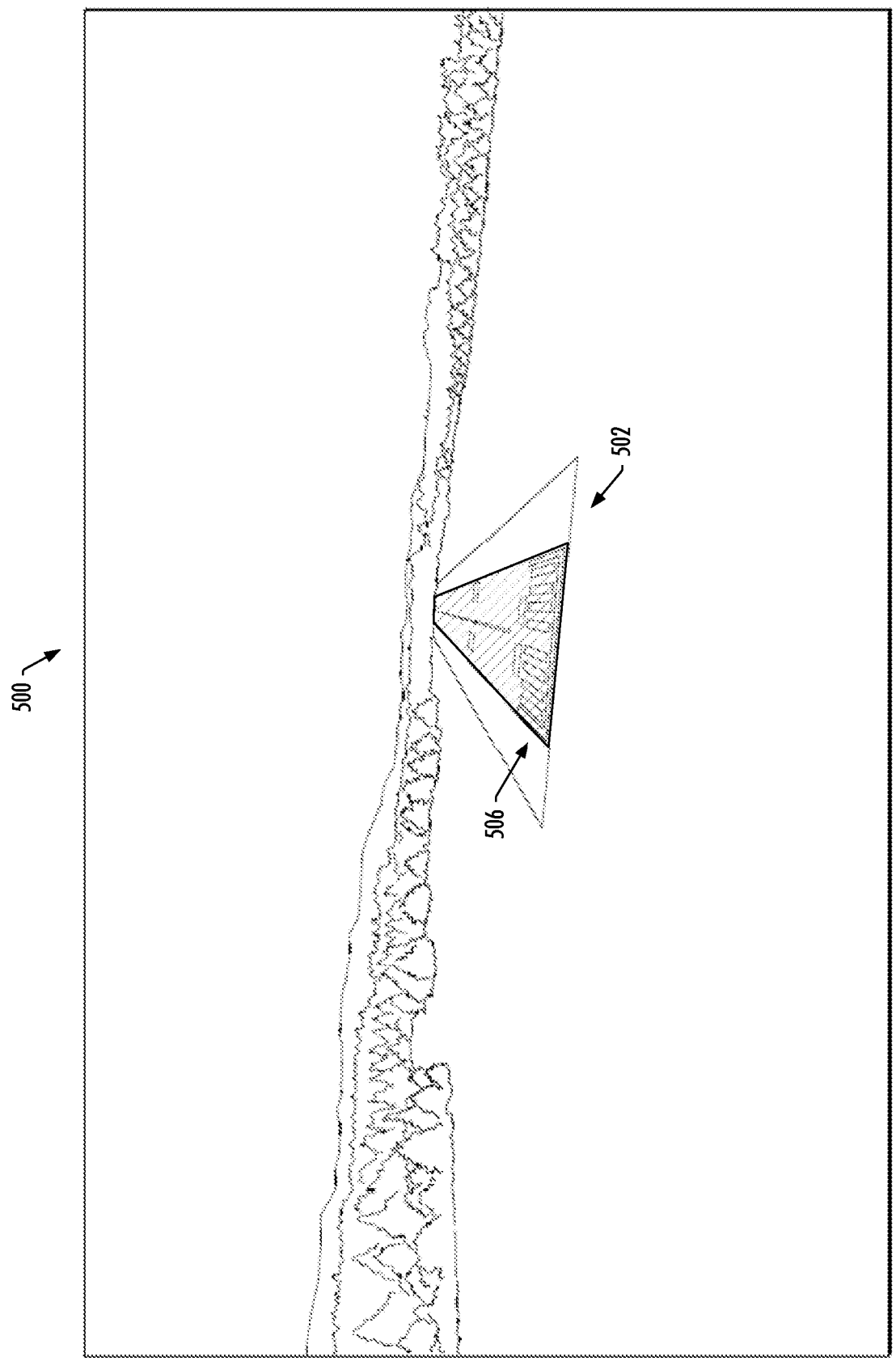
Figure 6A:
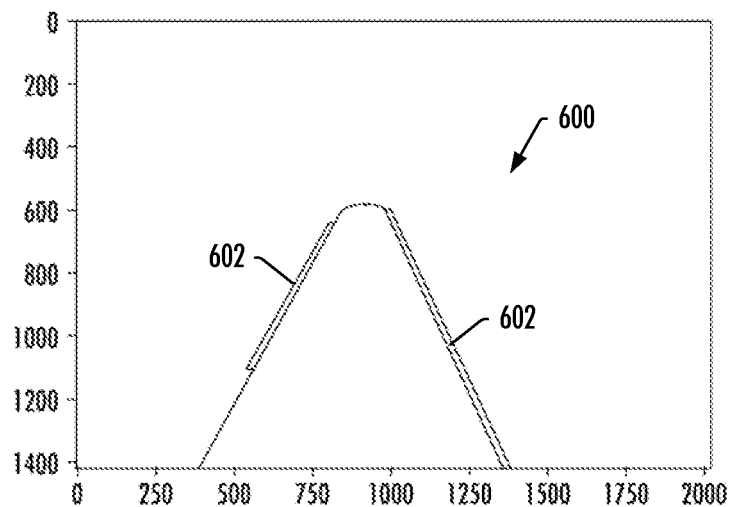
Figure 6B:
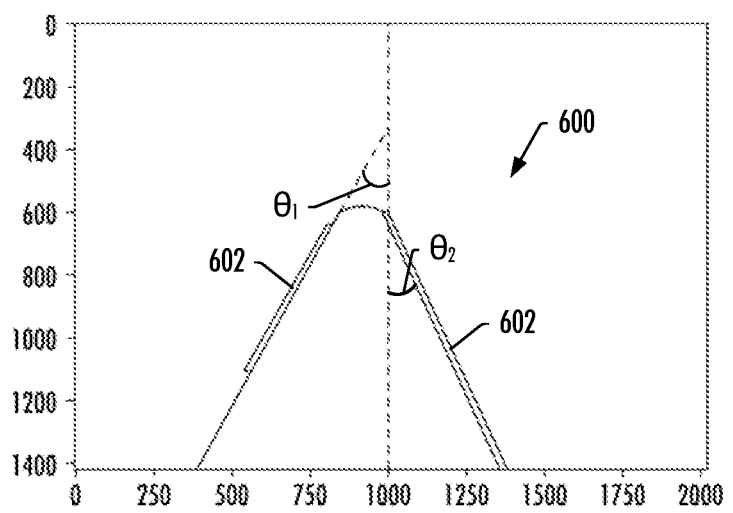
Figure 7:
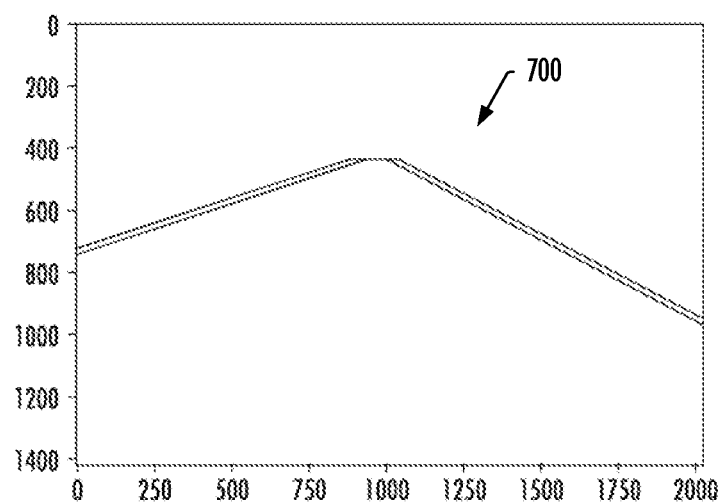
Figure 9A:
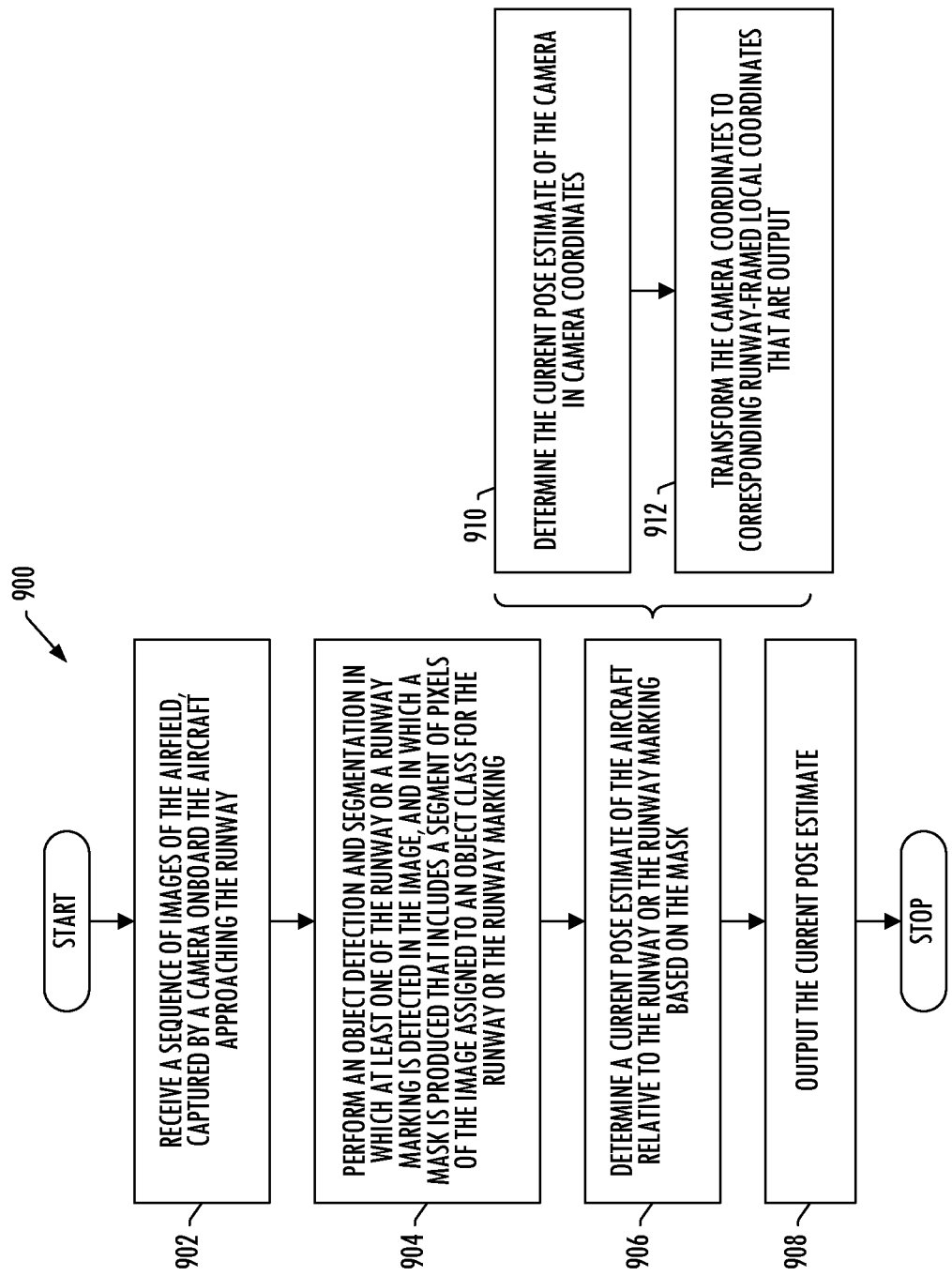
Figure 9B:
Figure 9C:
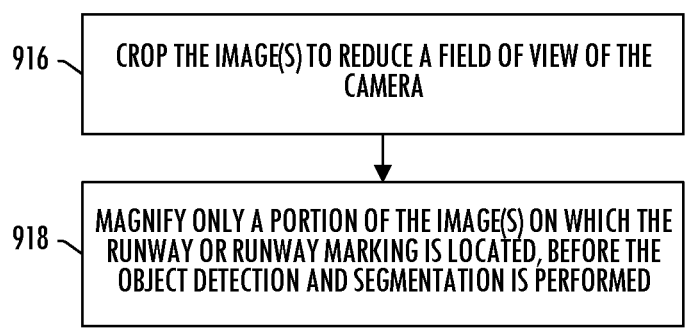
Figure 9D:
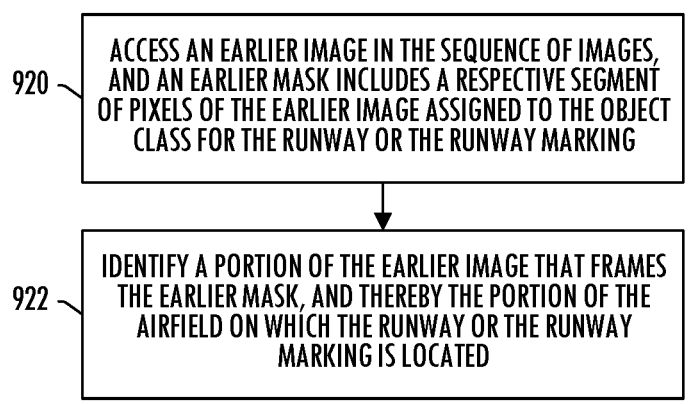
Figure 9E:
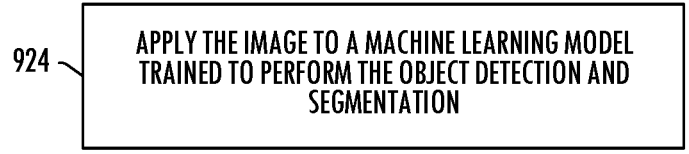
Figure 9F:
Figure 9G:
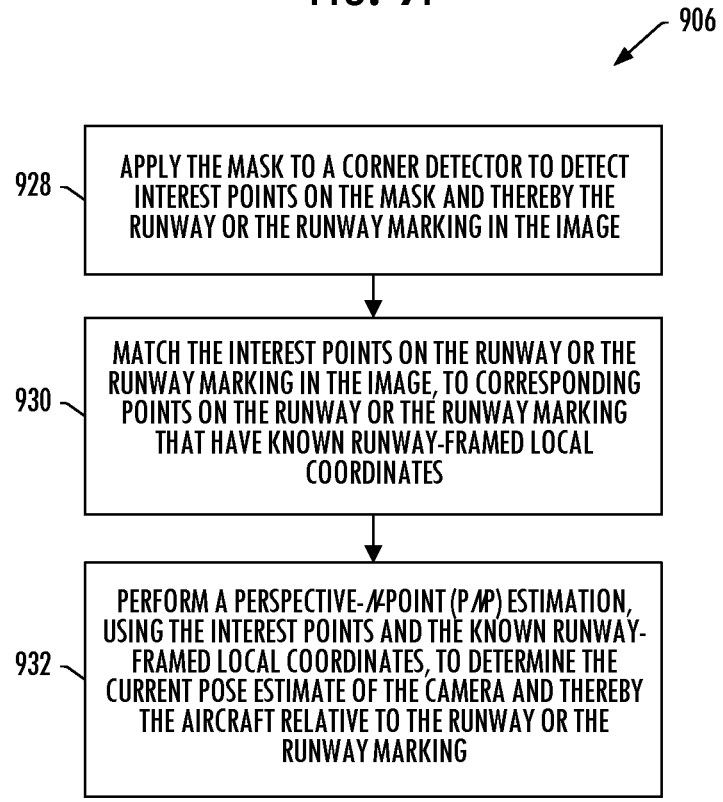
Figure 9H:
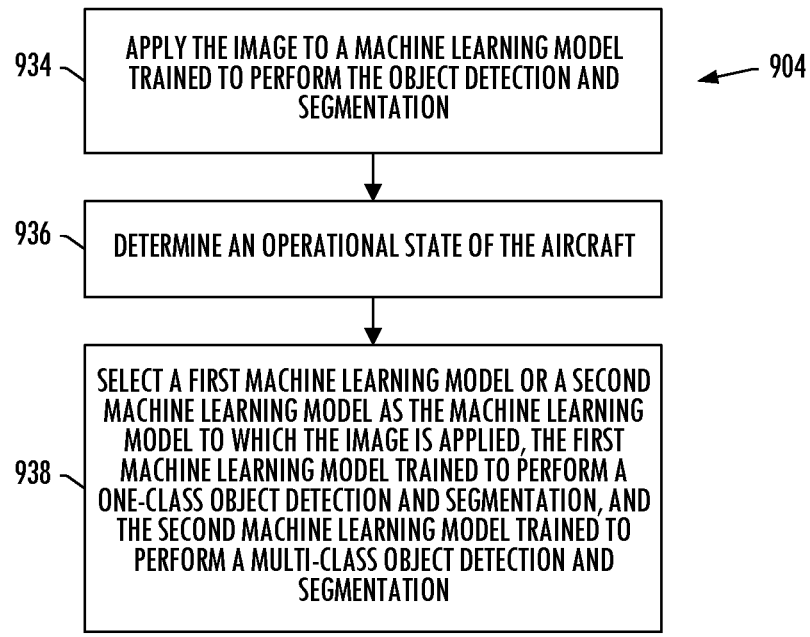
Figure 9I:
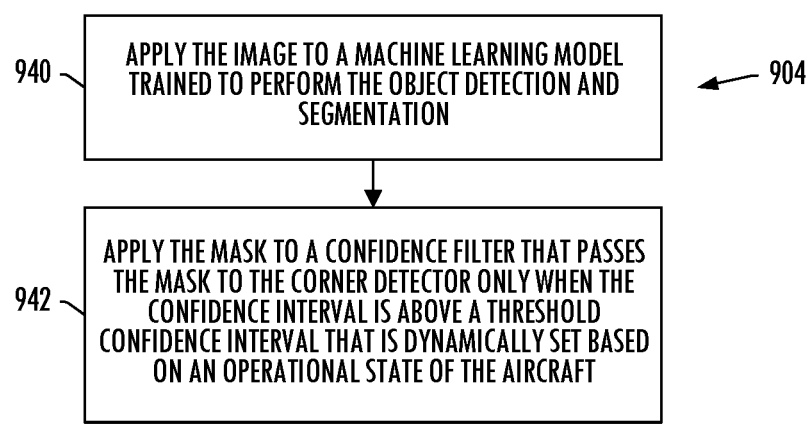
Figure 9J:
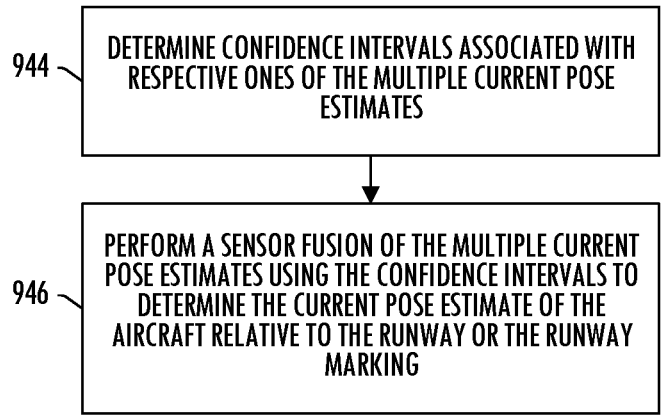
Figure 9K:
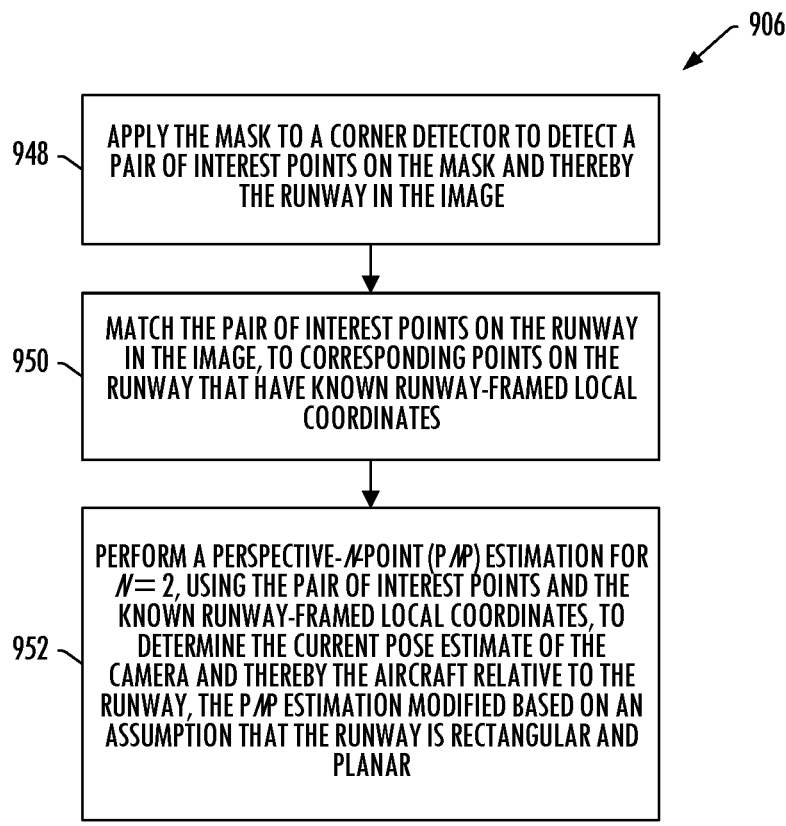
Figure 9L:
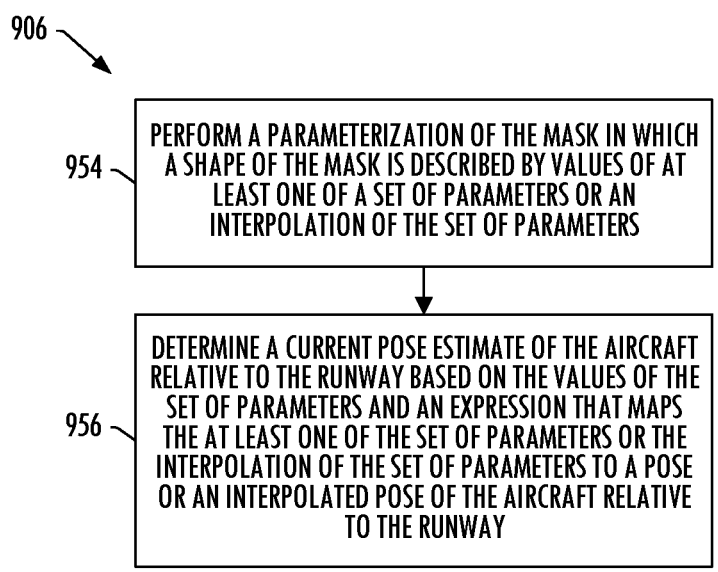
Figure 9M:
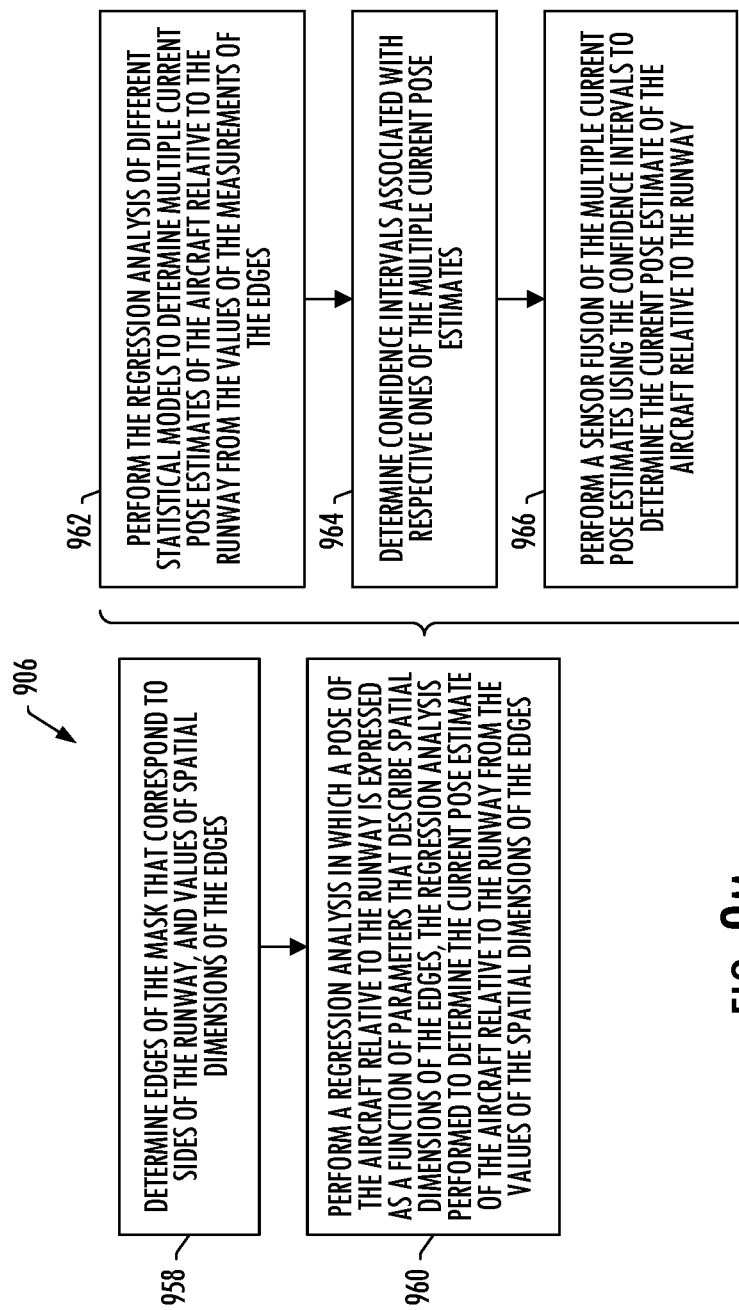
Figure 9N:
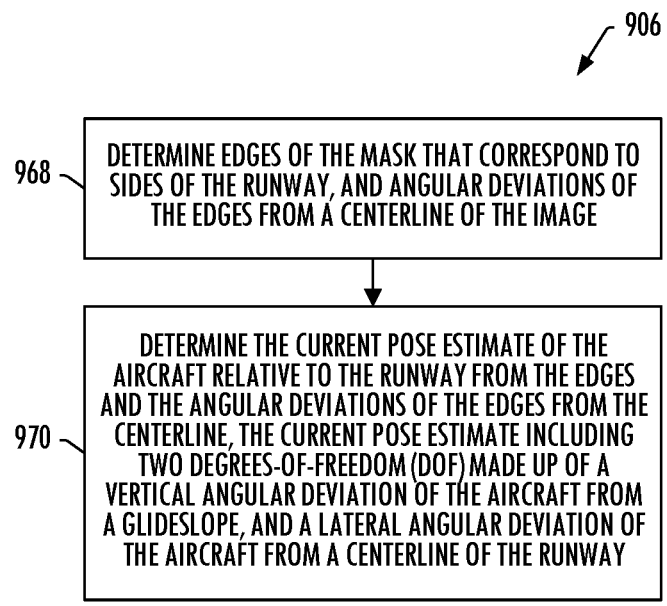
Figure 10:
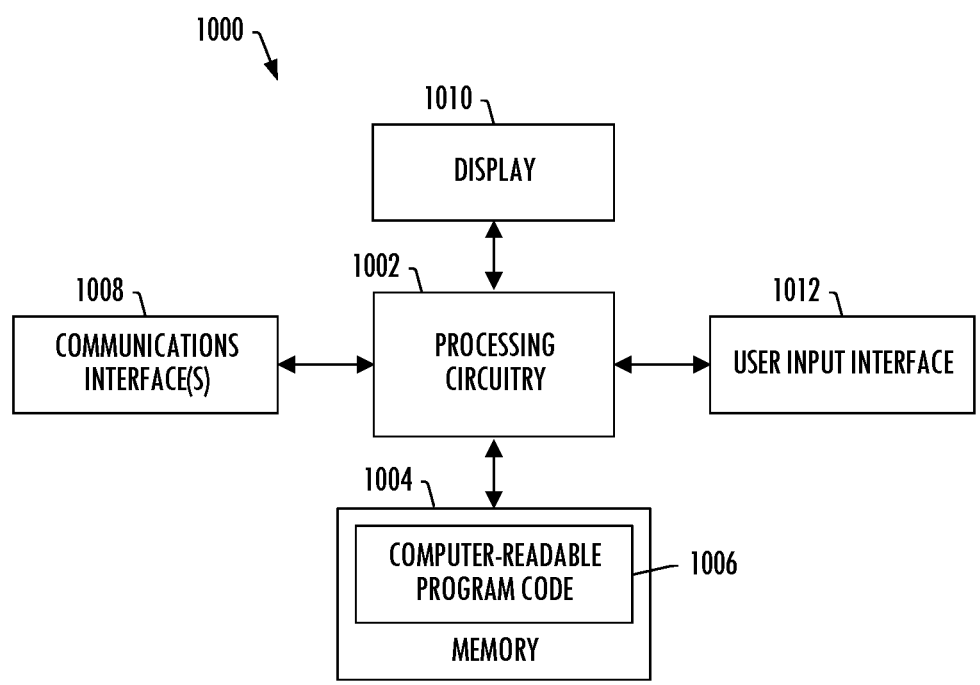

FIGS. 5A and 5B an image of a runway, and a mask of the runway that may be produced from an object detection and segmentation of the image, according to some example implementations;

FIGS. 6A, 6B and 7 illustrate masks of a runway according to various approaches of example implementations of the present disclosure;

FIGS. 8A, 8B, 8C, 8D, 8E and 8F are flowcharts illustrating various steps in a method of supporting an aircraft approaching a runway on an airfield, according to some example implementations;

FIGS. 9A, 9B, 9C, 9D, 9E, 9F, 9G, 9H, 9I, 9J, 9K, 9L, 9M and 9N are flowcharts illustrating various steps in a method of supporting an aircraft approaching a runway on an airfield, according to other example implementations; and FIG. 10 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure are directed to the autonomous detection of runways (including heliports) and runway markings. To address and overcome technical challenges associated with autonomous approach and landing operations in aircraft, example implementations of the present disclosure provide a number of visual pose estimation approaches that rely on either or both computer vision heuristics or machine learning. Example implementations determine a current pose estimate of the aircraft relative to a runway for use in at least one of monitoring the current pose estimate, generating an alert based on the current pose estimate, or guidance or control of the aircraft on a final approach.

Figure 1:
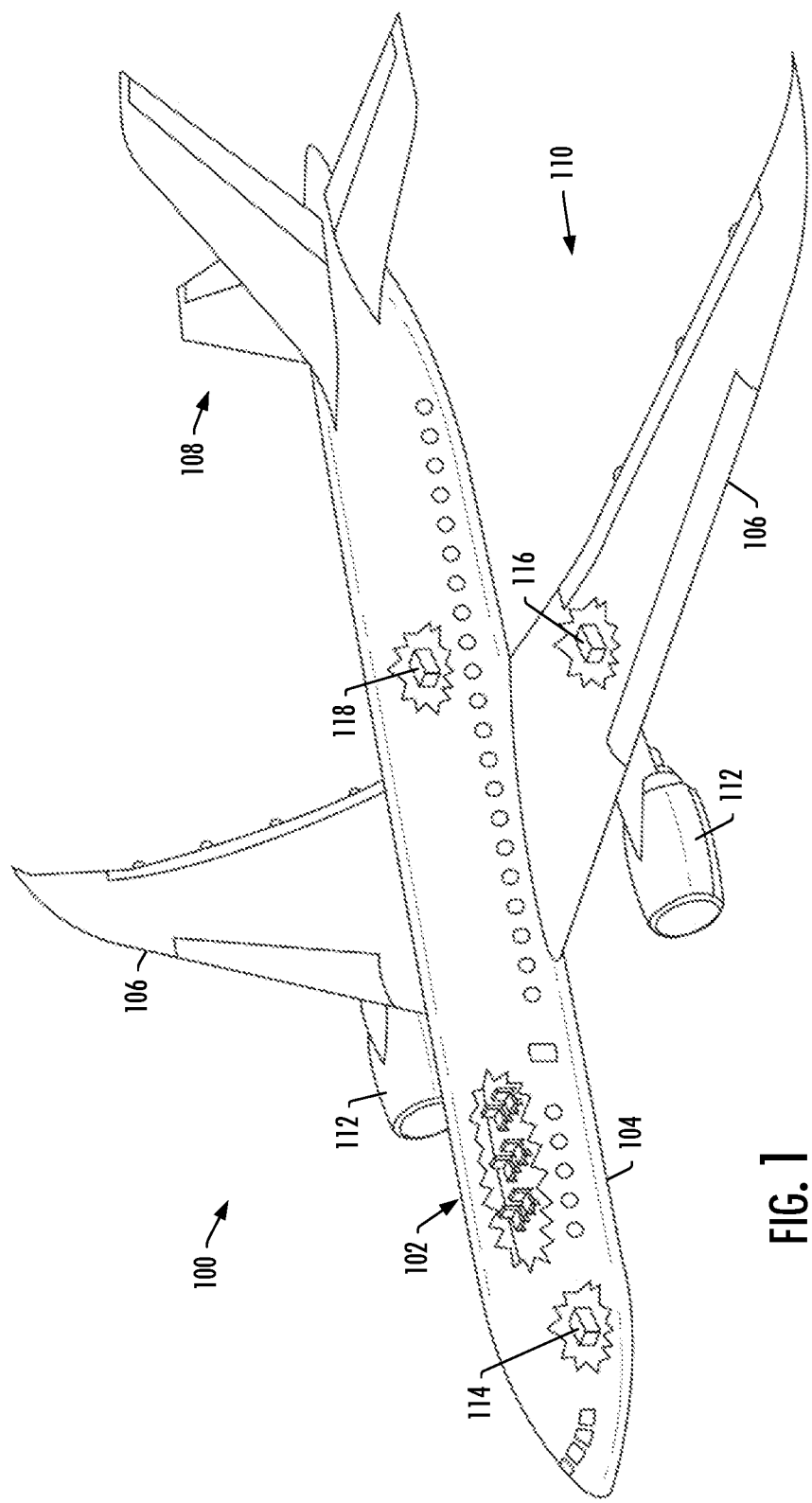
FIG. 1 illustrates an aircraft according to some example implementations of the present disclosure.

Example implementations of the present disclosure are directed to aircraft operation. FIG. 1 illustrates one type of aircraft 100 that may benefit from example implementations of the present disclosure. As shown, the aircraft includes an airframe 102 with a fuselage 104, wings 106 and tail 108. The aircraft also includes a plurality of high-level systems 110 such as a propulsion system. In the particular example shown in FIG. 1, the propulsion system includes two wing-mounted engines 112. In other embodiments, the propulsion system can include other arrangements, for example, engines carried by other portions of the aircraft including the fuselage and/or the tail. The high-level systems may also include an electrical system 114, hydraulic system 116 and/or environmental system 118. Any number of other systems may be included.

Figure 2A:
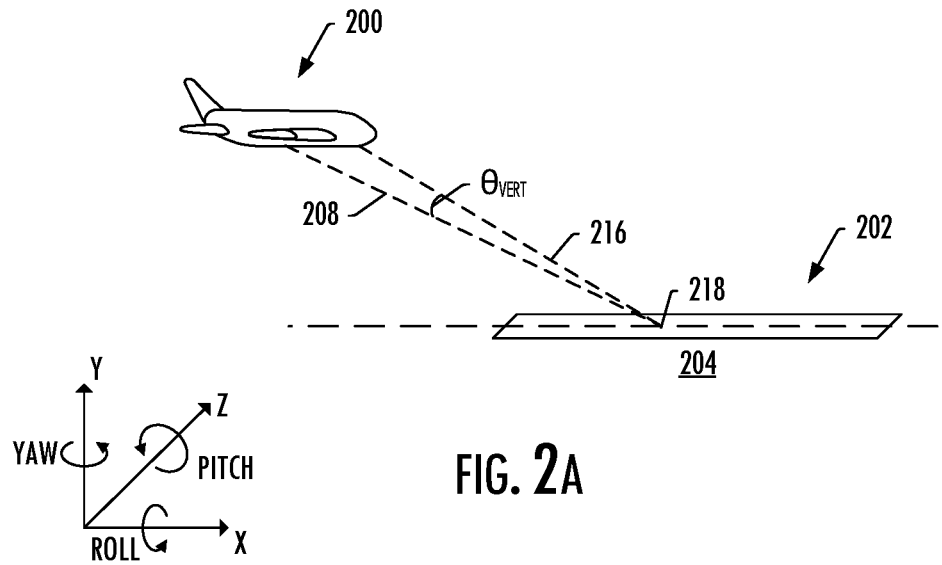
FIGS. 2A and 2B illustrate an aircraft approaching a runway on an airfield, according to some example implementations.
Figure 2B:
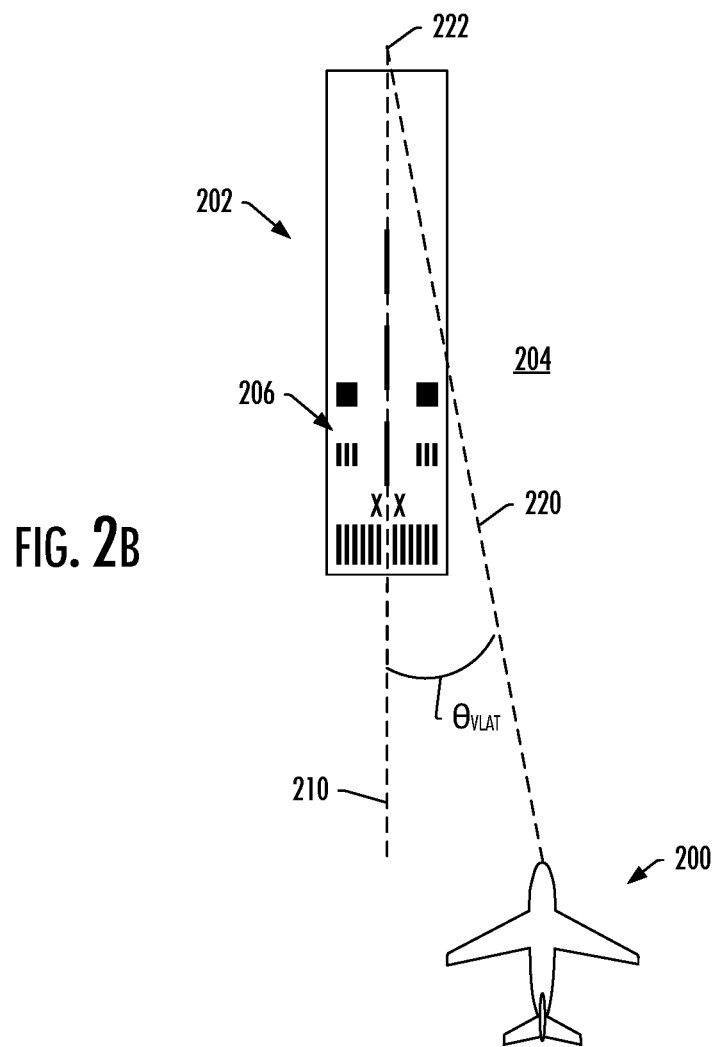

FIGS. 2A and 2B illustrate an aircraft 200 such as aircraft 100 approaching a runway 202 on an airfield 204, according to some example implementations of the present disclosure. As also shown, the runway includes runway markings 206 such as threshold markings (piano keys), runway designation markings, touchdown zone markings, aiming point markings (aim pads), runway edge lines, centerline markings, increment distance markings, and the like.

As the aircraft 200 approaches the runway 202—and particularly on a final approach—it may be useful to estimate the position and orientation of the aircraft relative to the runway. This position and orientation is referred to as the pose of the aircraft relative to the runway, and it may be used for monitoring, generating an alert, and/or guidance or control of the aircraft.

The pose of the aircraft 200 relative to the runway may be expressed in a number of different manners, and with a number of different components that correspond to degrees of freedom (DOF). In various examples, the pose of the aircraft may be expressed in six degrees of freedom (6DOF) by its position in coordinates on three principal axes including a longitudinal axis (roll axis, x-axis), vertical axis (yaw axis, y-axis) and transverse axis (pitch axis, z-axis), as well as its orientation expressed as rotation (yaw, pitch, roll) around the principal axes.

In some examples, the pose of the aircraft 200 may be expressed in two degrees of freedom (2DOF) relative to a glideslope 208 and a centerline 210 of the runway 202. The glideslope is set as a predefined angle above horizontal (ground level), such as 3° above horizontal, and it may also be referred to as the glide path angle (GPA). The pose of the aircraft in some of these examples may be expressed as a vertical angular deviation $\theta_{VERT}$ of the aircraft from the glideslope, and a lateral angular deviation $\theta_{LAT}$ of the aircraft from the centerline of the runway. A vector 216 extends from the aircraft to a glide path intercept point 218; and the vertical angular deviation is the difference between an angle between the vector and horizontal, and the glide path angle. Similarly, a vector 220 extends from the aircraft to an azimuth reference point 222; and the lateral angular deviation is the angle between the runway center point and the azimuth reference point.

In yet other examples, the pose of the aircraft 200 may be expressed some combination of the components of either or both of the above-described 6DOF and 2DOF. In particular, for example, the pose of the aircraft relative to the runway 202 may be expressed in 3DOF as a combination of an x coordinate (distance to the runway), y coordinate (altitude), and lateral angular deviation $\theta_{LAT}$.

Figure 3:
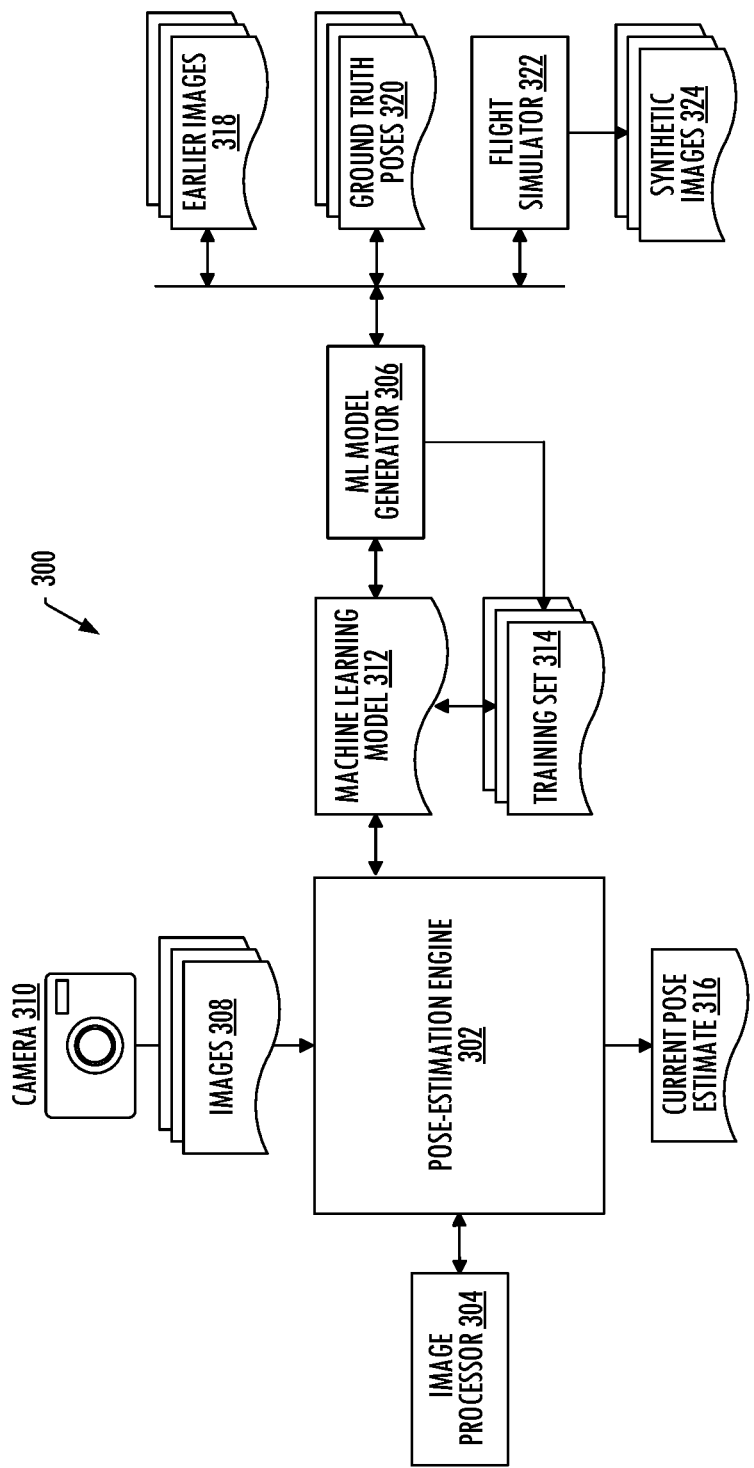
FIGS. 3 and 4 illustrate systems for supporting an aircraft approaching a runway on an airfield, according to various example implementations.
Figure 4:
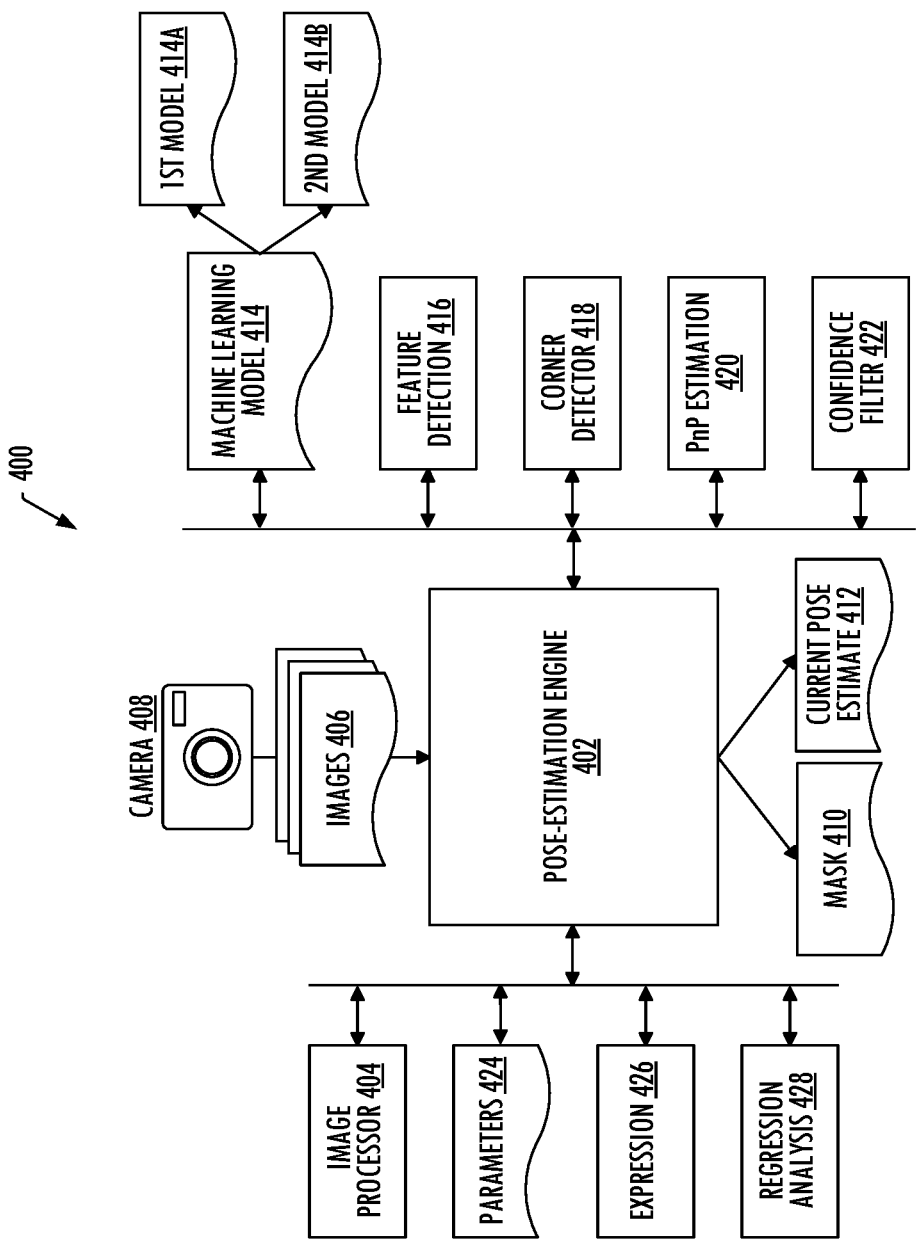

FIGS. 3 and 4 illustrate systems 300, 400 for supporting an aircraft 200 approaching a runway 202 on an airfield 204, according to example implementations of the present disclosure. The systems may include any of a number of different subsystems (each an individual system) for performing one or more functions or operations. One or more of the subsystems may be located onboard the aircraft, or remote from the aircraft such as at an operations center of the aircraft. The subsystems may be co-located or directly coupled to one another, or in some examples, various ones of the subsystems may communicate with one another across one or more computer networks. Similarly, the aircraft may communicate with one or more of the subsystems across the one or more computer networks, which during flight may be facilitated by one or more artificial satellites, ground stations and the like.

Although shown as part of the systems 300, 400, it should be understood that any one or more of the subsystems may function or operate as a separate system without regard to any of the other subsystems. It should also be understood that the systems may include one or more additional or alternative subsystems than those shown in the figures.

The systems 300, 400 of example implementations are generally configured to determine pose estimates of the aircraft 200 relative to the runway 202. The systems may operate similar to a human pilot on runway approach or takeoff, and may be deployed in autonomous, semi-autonomous or open-loop operation. The systems may operate independent of radio navigation, such as ILS, GPS and the like. The pose estimates may be provided in any of a number of degrees of freedom, which may in some examples be configurable. The system in some implementations may determine a pose estimate even when specific runway markings or other features are not visible in an image, which may enable the system to work for both takeoff and landing.

More particularly, the system 300 shown in FIG. 3 is generally configured to use images and machine learning to determine pose estimates of the aircraft 200 relative to the runway 202. As shown, the system of some example implementations includes a pose-estimation engine 302, an image processor 304 and a machine learning (ML) model generator 306. The pose-estimation engine is configured to receive a sequence of images 308 of the airfield, captured by at least one camera 310 onboard the aircraft 200 approaching the runway 202. The camera may be any of a number of different types of camera capable of capturing a sequence of images, including but not limited to visual imaging devices, hyperspectral imaging devices, LIDAR imaging devices, RADAR imaging device, and the like. In various examples, the camera is located onboard the aircraft in a configuration that allows the camera to capture a view of the environment ahead of the aircraft in the direction of travel of the aircraft.

For at least one image of the sequence of images, the pose-estimation engine 302 is configured to apply the at least one image to a machine learning model 312 trained to predict a pose of the aircraft 200 relative to the runway 202. In this regard, the machine learning model is configured to map the at least one image to the pose based on a training set 314 of labeled images with respective ground truth poses of the aircraft relative to the runway. For a pose expressed in 6DOF, the pose and the respective ground truth poses may be expressed in x, y, z coordinates, and yaw, pitch, roll angles; and for 2DOF, the pose and the respective ground truth poses may be expressed in vertical and lateral angular deviation.

The pose-estimation engine 302 is configured to output the pose as a current pose estimate 316 of the aircraft 200 relative to the runway 202 for use in at least one of monitoring the current pose estimate, generating an alert based on the current pose estimate, or guidance or control of the aircraft on a final approach.

In some examples, the machine learning model 312 is expressed as a custom deep neural network such as a convolutional neural network (CNN). The machine learning model may therefore be designed to include a full image-resolution input layer (e.g., 1024×768 pixels), and allow for configurable depth to enable optimization based on implementation. The machine learning model may include a CNN, as well as a fully-connected dense network and an n-DOF regression, such as a 6DOF regression or a 2DOF regression.

In some examples, the pose-estimation engine 302 is configured to apply the at least one image of the sequence of images 308 to the machine learning model trained to predict a pose of the at least one camera in camera coordinates. In some of these examples, the pose-estimation engine is configured to transform the camera coordinates for the at least one camera to corresponding runway-framed local coordinates and thereby predict the pose of the aircraft relative to the runway 202. This transformation may be known prior to deployment of the system 300, and correct for any aircraft offset.

In some examples, the of the sequence of images 308 and the labeled images of the training set 314 are in a non-visible light spectrum. In other examples, the labeled images are mono-channel images, and the at least one image is a multi-channel image. In some of these examples, the image processor 304 is configured to convert the multi-channel image to a mono-channel image that is applied to the machine learning model 312.

In some examples, the image processor 304 is configured to crop the at least one image of the sequence of images 308 to reduce a field of view of the at least one camera 310, and magnify only a portion of the at least one image on which the runway 202 is located, before the at least one image is applied to the machine learning model 312.

In some examples, the ML model generator 306 is configured to generate the training set 314 of labeled images. In some of these examples, the ML model generator is configured to receive earlier images 318 of the airfield, captured by the at least one camera 310 onboard the aircraft or a second aircraft approaching the runway 202. The ML model generator is also configured to receive the respective ground truth poses 320 of the aircraft or the second aircraft relative to the runway, which may be determined from radio navigation. The ML model generator, then, may be configured to label the earlier images with the respective ground truth poses of the aircraft to generate the training set of labeled images.

In some examples, the ML model generator 306 configured to generate the training set 314 of labeled images includes the ML model generator configured to execute a flight simulator 322 configured to artificially re-create flight of the aircraft approaching the runway 202 on the airfield. In some of these examples, the ML model generator is configured to capture synthetic images 324 of the airfield, and determine the respective ground truth poses 320 of the aircraft relative to the runway, from the flight simulator. And in some of these examples, the ML model generator is configured to label the synthetic images with the respective ground truth poses of the aircraft to generate the training set of labeled images.

In some examples, the pose-estimation engine 302 is configured to apply the at least one image of the sequence of images 308 to machine learning models 312 trained to predict respective components of the pose of the aircraft relative to the runway 202. In some of these examples, the machine learning models are configured to determine values of the components and thereby the pose of the aircraft relative to the runway, such as in a number of DOF.

In some examples, the pose-estimation engine 302 is configured to apply the at least one image of the sequence of images 308 to machine learning models 312 trained to predict multiple current pose estimates 316 according to different algorithms. In some of these examples, the pose-estimation engine is configured to determine confidence intervals associated with respective ones of the multiple current pose estimates. The pose-estimation engine is then configured to perform a sensor fusion of the multiple current pose estimates using the confidence intervals to determine the current pose estimate of the aircraft relative to the runway 202.

Turning to FIG. 4, similar to system 300, the system 400 is also generally configured to use images to determine pose estimates of the aircraft 200 relative to the runway 202. The system 400 is configured to perform an object detection and segmentation of an image to detect the runway and/or a runway marking, and produce a mask of pixels of the image assigned to an object class for the runway or runway marking. The system is then configured to determine a current pose estimate of the aircraft based on the mask. In various examples, the system may perform either or both the object detection and segmentation, or determine the current pose estimate, according to a variety of techniques.

Similar to the system 300 of FIG. 3, the system 400 of FIG. 4 includes a pose-estimation engine 402 and an image processor 404. The pose-estimation engine is configured to receive a sequence of images 406 of the airfield, captured by at least one camera 408 onboard the aircraft 200 approaching the runway 202. The camera 408 may be the same as or similar to the camera 310. FIG. 5A is one example of a suitable image 500 of a runway 502 including runway markings 504. For at least one image of the sequence of images, the pose-estimation engine is configured to perform an object detection and segmentation in which at least one of the runway on the airfield, or a runway marking on the runway, is detected in the image. This may include a pixel-wise instance segmentation.

As shown, mask 410 is also produced from the object detection and segmentation. The mask includes a segment of pixels of the image assigned to an object class for the runway 202 or the runway marking 222. FIG. 5B illustrates a mask 506 of the runway 502 that may be produced from an object detection and segmentation of the image 500 shown in FIG. 5A. The pose-estimation engine is configured to determine a current pose estimate 412 of the aircraft relative to the runway or the runway marking based on the mask, which may be independent of radio navigation. And pose-estimation engine is configured to output the current pose estimate for use in at least one of monitoring the current pose estimate, generating an alert based on the current pose estimate, or guidance or control of the aircraft on a final approach.

In some examples, the pose-estimation engine 402 is configured to determine the current pose estimate of the at least one camera in camera coordinates. In some of these examples, the pose-estimation engine is configured to transform the camera coordinates for the at least one camera to corresponding runway-framed local coordinates that are output for use in the at least one of monitoring the current pose estimate, generating the alert based on the current pose estimate, or guidance or control of the aircraft.

In some examples, the of the sequence of images 406 are in a non-visible light spectrum. In other examples, the image is a multi-channel image. In some of these examples, the image processor 404 is configured to convert the multi-channel image to a mono-channel image on which the object detection and segmentation is performed.

In some examples, the image processor 404 is configured to crop the at least one image of the sequence of images 406 to reduce a field of view of the at least one camera 408, and magnify only a portion of the at least one image on which the runway 202 is located, before the object detection and segmentation is performed.

In some further examples, the image processor 404 is configured to access an earlier image in the sequence of images 406, and an earlier mask includes a respective segment of pixels of the earlier image assigned to the object class for the runway 202 or the runway marking 222. In some of these examples, the image processor is configured to identify a portion of the earlier image that frames the earlier mask, and thereby the portion of the airfield on which the runway 202 or the runway marking is located. And the image processor is configured to crop the image to a portion of the image that corresponds to the portion of the earlier image.

In some examples, the pose-estimation engine 402 configured to perform the object detection and segmentation includes the pose-estimation engine configured to apply the image to a machine learning model 414 trained to perform the object detection and segmentation. In some examples, the pose-estimation engine configured to perform the object detection and segmentation includes the pose-estimation engine configured to perform a feature detection 416 in which features of the runway 202 or the runway marking 222 are detected in the image, and in which the mask 410 is produced from the features.

Perception-Based Approach. In some examples, the pose-estimation engine 402 configured to determine the current pose estimate 412 includes the pose-estimation engine configured to apply the mask 410 to a corner detector 418 to detect interest points on the mask and thereby the runway 202 or the runway marking 222 in the image. Examples of suitable interest points include points on the mask that correspond to points on the runway such as corners of the runway, points on one or more of the runway markings (e.g., center points), and the like. In some of these examples, the pose-estimation engine is configured to match the interest points on the runway or the runway marking in the image, to corresponding points on the runway or the runway marking that have known runway-framed local coordinates. And the pose-estimation engine is configured to perform a perspective-n-point (PnP) estimation 420, using the interest points and the known runway-framed local coordinates, to determine the current pose estimate of the at least one camera and thereby the aircraft 200 relative to the runway or the runway marking. PnP is a well-established computer vision algorithm that may determine a pose estimate given a mapping of pixel coordinates to known runway-framed local coordinates. Some implementations of PnP require a minimum of two to four points, while others require more points.

In some further examples in which the pose-estimation engine 402 configured to apply the image to the machine learning model 414, the pose-estimation engine is configured to determine an operational state of the aircraft. Based on the operational state, the pose-estimation engine is configured to select a first machine learning model 414A or a second machine learning model 414B as the machine learning model to which the image is applied. In some of these examples, the first machine learning model is trained to perform a one-class object detection and segmentation, and the second machine learning model trained to perform a multi-class object detection and segmentation.

In some examples in which the image is applied to the machine learning model 414 trained to perform the object detection and segmentation, the machine learning model further determines a confidence interval or multi-dimensional confidence matrix associated with detection of the runway 202 or the runway marking 222. In some of these examples, the pose-estimation engine 402 is configured to apply the mask 410 to a confidence filter 422 that passes the mask to the corner detector 418 only when the confidence interval is above a threshold confidence interval that is dynamically set based on an operational state of the aircraft 200.

The PnP estimation 420 of some examples is performed to determine to multiple current pose estimates 412 of the aircraft 200 relative to the runway 202 or the runway marking 222. In some of these examples, the pose-estimation engine 402 is configured to determine confidence intervals associated with respective ones of the multiple current pose estimates. The pose-estimation engine 402 is configured to perform a sensor fusion of the multiple current pose estimates using the confidence intervals to determine the current pose estimate of the aircraft relative to the runway or the runway marking.

Modified PnP Approach. The PnP estimation 420 may be used to determine the current pose estimate 412 from n corresponding points. Given a known calibration of the camera 408 and the location of four projected points, quadratic equations for pose estimation may be postulated. The quadratic equations may lead to $2^4$ solutions for their parameters (with four possible solutions with positive z-values). In some PnP algorithms, the most likely set of parameters may be determined with iterative or geometric methods. According to a modified PnP approach, a-priori knowledge that applies to all runways can be leveraged to reduce the number of points needed, reduce computational cost and solution ambiguity. This approach is premised on an assumption that the runway 202 is rectangular and planar.

According to the modified PnP approach of some examples in which the object detection and segmentation is performed to detect the runway 202, the pose-estimation engine 402 is configured to apply the mask 410 to the corner detector to detect a pair of interest points on the mask and thereby the runway in the image. The pose-estimation engine is configured to match the pair of interest points on the runway in the image, to corresponding points on the runway that have known runway-framed local coordinates. The pose-estimation engine is configured to perform the PnP estimation for n=2, using the pair of interest points and the known runway-framed local coordinates, to determine the current pose estimate of the at least one camera and thereby the aircraft 200 relative to the runway.

As indicated above, the PnP estimation 420 is modified based on an assumption that the runway 202 is rectangular and planar. The assumption that the runway is planar may simplify y coordinates of corners of the runway (interest points) to all y=0. The assumption that the runway is rectangular may simplify x, z coordinates of corners of the runway (interest points) with unknown runway length and width as follows: $P0_{x,z}=(0,0)$; $P1_{x,z}=([P0_x+\text{runway\_length}], P0_z)$; $P2_{x,z}=([P0_x+\text{runway\_length}], [P0_z+\text{runway\_width}])$; and $P3_{x,z}=([P0_x, [P0_z+\text{runway\_width}])$. The PnP estimation is also performed as modified to determine the current pose estimate including 2DOF made up of the vertical angular deviation $\theta_{VERT}$ of the aircraft from the glideslope 208, and a lateral angular deviation $\theta_{LAT}$ of the aircraft from the centerline 210 of the runway.

In particular, for example, the runway 202 may be assumed to be a rectangular, level plane at unknown runway-framed local coordinates (x, 0, z), and an unknown orientation along the z/x axis. The runway may also be assumed to have an unknown width. The relation between real world position and rotation and projected representation, then, may be described with:

$$\frac{c-a}{o} = \frac{-\cos(r)(\cos(q)\times(-1)x - \sin(q)\cos(p)\times(-1)z) - \sin(r)\sin(p)z}{\sin(q)x - \cos(q)\cos(p)\times(-1)z}$$

$$\frac{b-d}{o} = \frac{\sin(r)(z\cos(p)\sin(q) - x\cos(q) + z\sin(p)\cos(r))}{-z\cos(p)\cos(q) - x\sin(q)}$$

In the preceding, (a, b)=pixel position (x, y); (c, d)=screen center (x, y); o=scaling factor; (p, q, r)=rotation angles around (x, y, z); x=reference point world runway-framed local coordinate x; and z=runway-framed local coordinate z. When reducing roll angle to zero (rotation of the input image to level the horizon), it can be shown that only two points (e.g. two threshold center points) may be needed for a single solution for the lateral and (if the runway length is known) the vertical angular deviation. The threshold center points here refer to the center point of each threshold marking (on per approach end).

Shape-Based Approach. PnP estimation techniques often need two to four points on the runway 202, as well as the runway-framed local coordinates (x, y, z) of those points. The ability to perceive all four corners of a runway may be limited by environmental conditions, runway contamination, obstructions and the like. In accordance with a shape-based approach, the pose-estimation engine 402 may determine the current pose estimate 412 without any specific part of the runway visible in the image, and without a-priori knowledge of runway parameters. In accordance with the shape-based approach, the mask 410 to be unbounded or not approximated with an enclosing polygon. The approach also does not require any specific runway points.

The shape-based approach in some examples is premised on scale, translation and orientation invariant moments that describe the shape (mass distribution) of an object and can be made translation invariant or translation and scale invariant. In this regard, invariants $\eta_{ij}$ with respect to translation and scale may be determined from central moments by dividing through a scaled zero-th central moment $\mu_{00}$:

$$\eta_{ij} = \frac{\mu_{ij}}{\mu_{00}^{\left(1+\frac{i+j}{2}\right)}}$$

In the above, i+j≥2. It may also be noted that translational invariance directly follows by only using central moments. For a 2DOF pose estimate made up of the vertical and lateral angular deviation, the shape-based approach may include the pose-estimation engine inferring the current pose estimate from a runway based on the shape of a binary representation of a semantically-separated runway.

According to the shape-based approach, in some examples in which the object detection and segmentation is performed to detect the runway 202, the pose-estimation engine 402 is configured to perform a parameterization of the mask 410 in which a shape of the mask is described by values of at least one of a set of parameters 424 or an interpolation of the set of parameters. In some examples, the set of parameters 424 includes moment invariants of the mask 410, and the pose-estimation engine 402 is configured to perform the parameterization to determine values of the moment invariants of the mask.

In some examples, the pose-estimation engine 402 is configured to determine the current pose estimate of the aircraft 200 relative to the runway based on the values of the set of parameters and an expression 426 that maps the at least one of the set of parameters or the interpolation of the set of parameters to a pose or an interpolated pose of the aircraft relative to the runway. In various examples, the expression is implemented as a stochastic algorithm such as a machine learning algorithm. In other examples, the expression is implemented as a deterministic algorithm. In yet other examples, the expression is implemented as a lookup table of different values of the set of parameters and ground truth poses of the aircraft relative to the runway 202. In some of these examples, the pose-estimation engine may be configured to determine a closest match based on a moment invariant delta (e.g., closest scale, position or scale, position, orientation invariant shape match), such as from the lookup table or other implementation of the expression.

According to the shape-based approach, then, the shape of the runway 202 may be described as a set of parameters such as the moment invariants of the mask 410. The pose of the aircraft 200 relative to the runway may be determined in a number of different manners based on values of the set of parameters. The pose may be determined by looking up the closest set from a library of stored parameters and their associated poses (e.g., lateral and vertical deviation). The pose may be determined by interpolating the pose from a library of stored parameters and interpolating the associated pose. In another example, the pose may be determined from a machine learning algorithm trained to map the set of parameters to the associated pose. And in yet another example, the pose may be determined from a deterministic algorithm such as a mathematical relation that maps the set of parameters to the associated pose.

Two-Lines Approach. According to another approach, only two lines that correspond to sides of the runway 202 may be required to determine the current pose estimate 412. The pose-estimation engine 402 may therefore determine the current pose estimate without corners of the runway visible in the image, and instead use two vectors of unknown magnitude to determine the current pose estimate.

According to the two-lines approach, in some examples in which the object detection and segmentation is performed to detect the runway 202, the pose-estimation engine 402 is configured to determine edges of the mask 410 that correspond to sides of the runway, and values of spatial dimensions of the edges. FIG. 6A illustrates one example of a mask 600 with edges 602 that correspond to sides of a runway.

In some examples, the pose-estimation engine 402 is configured to perform a regression analysis 428 such as a multi-variate linear regression in which a pose of the aircraft relative to the runway is expressed as a function of parameters that describe spatial dimensions of the edges. The regression analysis is performed to determine the current pose estimate 412 of the aircraft relative to the runway from the values of the spatial dimensions of the edges. The spatial dimensions of the edges may be expressed in a number of different manners, such as in slope-intercept form, two-point form or the like.

In some further examples, the pose-estimation engine 402 is configured to perform the regression analysis in which components of the pose of the aircraft 200 are expressed as respective functions of parameters that describe the spatial dimensions of the edges. In some of these examples, the regression analysis is performed to determine values of the components and thereby the current pose estimate of the aircraft relative to the runway 202. In a more particular example implementation in which components of the current pose estimate include altitude (y), pitch and lateral angular offset ($\theta_{LAT}$), the components may be expressed as the following respective functions:

$$y=684.28-1183.2m_1-1.192b_1-916.74m_2-1.064b_2$$

$$\text{pitch}=-8.598+16.536m_1+0.000589b_1+26.6836m_2+0.028923b_2$$

$$\theta_{LAT}=33.848-35.01m_1+0.062b_1-170.081m_2-0.172b_2$$

In the preceding, the spatial dimensions of the edges may be expressed in slope-intercept form ($m_1$, $b_1$), ($m_2$, $b_2$).

In some examples, the pose-estimation engine 402 configured to perform the regression analysis includes the pose-estimation engine configured to perform the regression analysis of different statistical models to determine multiple current pose estimates 412 of the aircraft relative to the runway 202 from the values of the spatial dimensions of the edges. The pose-estimation engine is configured to determine confidence intervals associated with respective ones of the multiple current pose estimates, and perform a sensor fusion of the multiple current pose estimates using the confidence intervals to determine the current pose estimate of the aircraft relative to the runway.

Sideline Approach. Yet another approach, the sideline approach, is similar to the two-lines approach. The sideline approach does not require any particular points on the runway or a-priori knowledge of runway parameters. According to the sideline approach, in some examples in which the object detection and segmentation is performed to detect the runway 202, the pose-estimation engine 402 configured to determine the current pose estimate includes the pose-estimation engine configured to determine edges of the mask 410 that correspond to sides of the runway, and angular deviations of the edges from a centerline of the image. FIG. 6B illustrates the above example of the mask 600 with edges 602 that correspond to sides of a runway, and further including angular deviations $\theta_1$, $\theta_2$ from centerline 604.

In some examples, the pose-estimation engine 402 is configured to determine the current pose estimate 412 of the aircraft 200 relative to the runway 202 from the edges and the angular deviations of the edges from the centerline. The current pose estimate here includes two DOF made up of the vertical angular deviation $\theta_{VERT}$ of the aircraft from the glideslope 208, and the lateral angular deviation $\theta_{LAT}$ of the aircraft from a centerline 210 of the runway. The vertical angular deviation may be determined by the slope of the edge, a width over distance (number of pixels) relation, or some combination thereof. If the sum of both edges is positive then the camera 408 is on centerline and the lateral angular deviation is zero; otherwise, the lateral deviation may be qualified by the relative sum of the two angles. In particular, for example, the vertical angular deviation may be inferred from the slope of one of the edges and/or relative distance of the two edges from each other at predetermined points. The lateral angular deviation may be inferred from the difference between the angular deviations of the edges from the centerline.

In some implementations in which a portion of the runway 202 is clipped (not visible) in the image, the mask 410 may include up to six edges, as shown in FIG. 7 for a mask 700. In some of these examples, a shape detection function may be used to approximate a corresponding polygon, such as by using a recursive, up/down goal-seeking algorithm to control an accuracy parameter so that an intended number of edges are detected. The pose-estimation engine may be configured to determine the edges of the mask that correspond to the sides of the runway as the two longest, not near-horizontal, not near-vertical lines of the mask. In other implementations, the pose-estimation engine may be configured to determine all intersection points of all of the edges of the mask, and only consider those having a vanishing point near the horizon as probable sides of the runway.

FIGS. 8A-8F are flowcharts illustrating various steps in a method 800 of supporting an aircraft approaching a runway on an airfield, according to some example implementations. As shown at block 802 of FIG. 8A, the method includes receiving a sequence of images of the airfield, captured by at least one camera onboard the aircraft approaching the runway. The method includes, for at least one image of the sequence of images, applying the at least one image to a machine learning model trained to predict a pose of the aircraft relative to the runway, as shown at block 804. The machine learning model is configured to map the at least one image to the pose based on a training set of labeled images with respective ground truth poses of the aircraft relative to the runway. And as shown at block 806, the pose is output as a current pose estimate of the aircraft relative to the runway for use in at least one of monitoring the current pose estimate, generating an alert based on the current pose estimate, or guidance or control of the aircraft on a final approach.

In some examples, applying the at least one image to the machine learning model at block 804 includes applying the at least one image to the machine learning model trained to predict a pose of the at least one camera in camera coordinates, as shown at block 808. In some of these examples, the camera coordinates are transformed to corresponding runway-framed local coordinates and thereby predict the pose of the aircraft relative to the runway, as shown at block 810.

In some examples, the at least one image and the labeled images are in a non-visible light spectrum. In other examples, the labeled images are mono-channel images, the at least one image is a multi-channel image, and the method further comprises converting the multi-channel image to a mono-channel image that is applied to the machine learning model, as shown at block 812 of FIG. 8B.

Figure 8A:
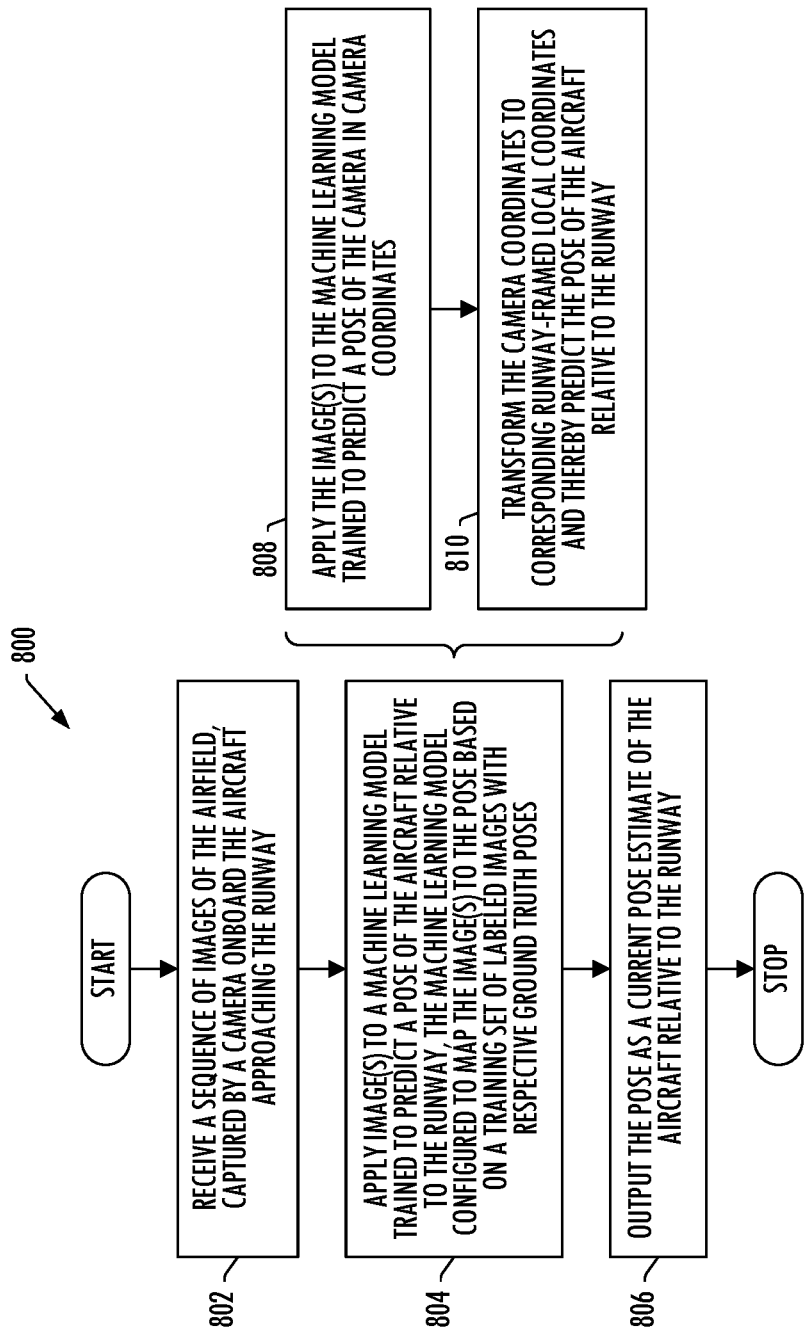
Figure 8B:
Figure 8C:
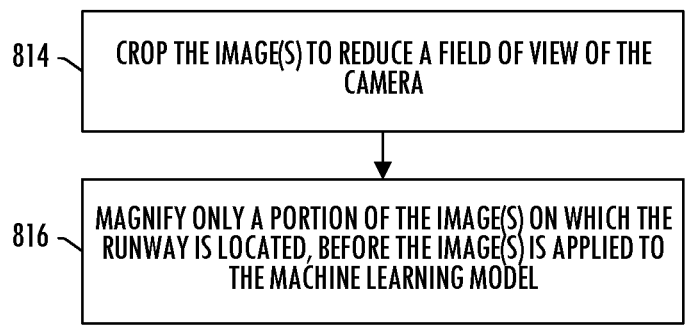

In some examples, the method 800 further includes cropping the at least one image to reduce a field of view of the at least one camera, as shown at block 814 of FIG. 8C. In some of these examples, as shown at block 816, the method also includes magnifying only a portion of the at least one image on which the runway is located, before the at least one image is applied to the machine learning model at block 804.

Figure 8D:
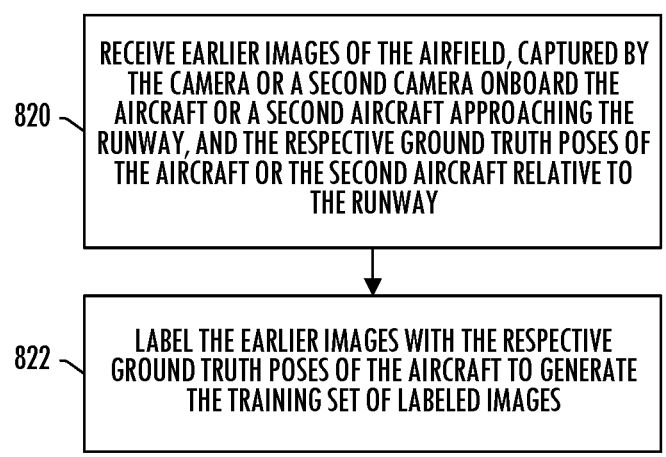

In some examples, the method 800 further includes generating the training set of labeled images, as shown at block 818 of FIG. 8D. In some of these examples, generating the training set includes receiving earlier images of the airfield, captured by the at least one camera onboard the aircraft or a second aircraft approaching the runway, and the respective ground truth poses of the aircraft or the second aircraft relative to the runway, as shown at block 820. The earlier images are labeled with the respective ground truth poses of the aircraft to generate the training set of labeled images, as shown at block 822.

Figure 8E:
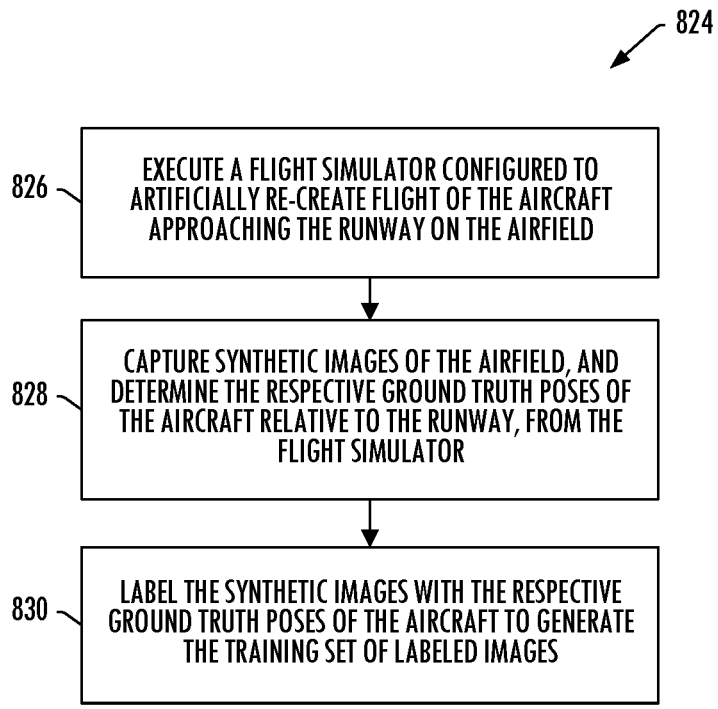
Figure 8F:
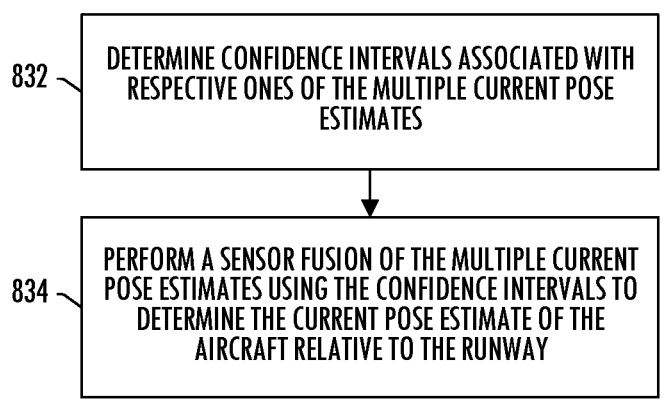

In some examples, the method 800 further includes generating the training set of labeled images as shown at 824 in FIG. 8E. In some of these examples, generating the training set includes executing a flight simulator configured to artificially re-create flight of the aircraft approaching the runway on the airfield, as shown at block 826. Generating the training set also includes capturing synthetic images of the airfield, and determining the respective ground truth poses of the aircraft relative to the runway, from the flight simulator, as shown at block 828. And the synthetic images are labeled with the respective ground truth poses of the aircraft to generate the training set of labeled images, as shown at block 830.

Briefly returning to FIG. 8A, in some examples, applying the at least one image to the machine learning model at block 804 includes applying the at least one image to machine learning models trained to predict respective components of the pose of the aircraft relative to the runway. The machine learning models are configured to determine values of the components and thereby the pose of the aircraft relative to the runway.

In some examples, applying the at least one image to the machine learning model at block 804 includes applying the at least one image to machine learning models trained to predict multiple current pose estimates according to different algorithms. In some of these examples, the method further includes determining confidence intervals associated with respective ones of the multiple current pose estimates, as shown at block 832 of FIG. 8F. Also in some of these examples, the method includes performing a sensor fusion of the multiple current pose estimates using the confidence intervals to determine the current pose estimate of the aircraft relative to the runway, as shown at block 834.

FIGS. 9A-9N are flowcharts illustrating various steps in a method 900 of supporting an aircraft approaching a runway on an airfield, according to other example implementations. As shown at block 902 of FIG. 9A, the method includes receiving a sequence of images of the airfield, captured by at least one camera onboard the aircraft approaching the runway. The method includes, for at least an image of the sequence of images, performing an object detection and segmentation in which at least one of the runway on the airfield, or a runway marking on the runway, is detected in the image, and in which a mask is produced that includes a segment of pixels of the image assigned to an object class for the runway or the runway marking, as shown at block 904. A current pose estimate of the aircraft relative to the runway or the runway marking is determined based on the mask, as shown at block 906. And the current pose estimate is output for use in at least one of monitoring the current pose estimate, generating an alert based on the current pose estimate, or guidance or control of the aircraft on a final approach, as shown at block 908.

In some examples, determining the current pose estimate of the aircraft relative to the runway or the runway marking at block 906 includes at least determining the current pose estimate of the at least one camera in camera coordinates, as shown at block 910. In some of these examples, the camera coordinates are transformed to corresponding runway-framed local coordinates that are output for use in the at least one of monitoring the current pose estimate, generating the alert based on the current pose estimate, or guidance or control of the aircraft, as shown at block 912.

In some examples, the sequence of images are in the non-visible light spectrum. In other examples, as shown at block 914 of FIG. 9B, the image is a multi-channel image, and the method 900 further includes converting the multi-channel image to a mono-channel image on which the object detection and segmentation is performed at block 904.

In some examples, the method 900 further includes cropping the image to reduce a field of view of the at least one camera, as shown at block 916 of FIG. 9C. In some of these examples, as shown at block 918, the method also includes magnifying only a portion of the image on which the runway or the runway marking is located, before the object detection and segmentation is performed at block 904.

In some further examples, the method 900 further includes accessing an earlier image in the sequence of images, and an earlier mask includes a respective segment of pixels of the earlier image assigned to the object class for the runway or the runway marking, as shown at block 920 of FIG. 9D. In some of these examples, the method includes identifying a portion of the earlier image that frames the earlier mask, and thereby the portion of the airfield on which the runway or the runway marking is located, as shown at block 922. And in some of these examples, cropping the image at block 916 includes cropping the image to a portion of the image that corresponds to the portion of the earlier image.

In some examples, performing the object detection and segmentation at block 904 includes applying the image to a machine learning model trained to perform the object detection and segmentation, as shown at block 924 of FIG. 9E.

In some examples, performing the object detection and segmentation at block 904 includes performing a feature detection in which features of the runway or the runway marking are detected in the image, and in which the mask is produced from the features, as shown at block 926 of FIG. 9F.

Turning now to NG. 9G, in some examples, determining the current pose estimate at block 906 includes at least applying the mask to a corner detector to detect interest points on the mask and thereby the runway or the runway marking in the image, as shown at block 928. The interest points on the runway or the runway marking in the image are matched to corresponding points on the runway or the runway marking that have known runway-framed local coordinates, as shown at block 930. And a perspective-n-point (PnP) estimation is performed, using the interest points and the known runway-framed local coordinates, to determine the current pose estimate of the at least one camera and thereby the aircraft relative to the runway or the runway marking, as shown at block 932.

In some further examples, performing the object detection and segmentation at block 904 includes applying the image to a machine learning model trained to perform the object detection and segmentation, as shown at block 934 of FIG. 9H. In some of these examples, the method 900 further includes determining an operational state of the aircraft, as shown at block 936 of FIG. 9H. In some of these examples, based on the operational state, a first machine learning model or a second machine learning model is selected as the machine learning model to which the image is applied, as shown at block 938. The first machine learning model is trained to perform a one-class object detection and segmentation, and the second machine learning model is trained to perform a multi-class object detection and segmentation.

In some examples, performing the object detection and segmentation at block 904 includes applying the image to a machine learning model trained to perform the object detection and segmentation, as shown at block 940 of FIG. 9I. In some of these examples, the machine learning model further determines a confidence interval or multi-dimensional confidence matrix associated with detection of the runway or the runway marking. Also in some of these examples, the method 900 further includes applying the mask to a confidence filter that passes the mask to the corner detector only when the confidence interval is above a threshold confidence interval that is dynamically set based on an operational state of the aircraft, as shown at block 942.

Briefly returning to FIG. 9G, in some examples, the PnP estimation is performed at block 932 to determine to multiple current pose estimates of the aircraft relative to the runway or the runway marking. In some of these examples, the method 900 further includes determining confidence intervals associated with respective ones of the multiple current pose estimates, as shown at block 944 of FIG. 9J. Also in some of these examples, the method includes performing a sensor fusion of the multiple current pose estimates using the confidence intervals to determine the current pose estimate of the aircraft relative to the runway or the runway marking, as shown at block 946.

In some examples, the object detection and segmentation is performed at block 904 to detect the runway, and in which the mask includes the segment of pixels of the image assigned to the object class for the runway. In some of these examples, determining the current pose estimate at block 906 includes at least applying the mask to a corner detector to detect a pair of interest points on the mask and thereby the runway in the image, as shown at block 948 of FIG. 9IK. The pair of interest points on the runway in the image is matched to corresponding points on the runway that have known runway-framed local coordinates, as shown at block 950.

Also in some of these examples, a PnP estimation is performed for n=2, using the pair of interest points and the known runway-framed local coordinates, to determine the current pose estimate of the at least one camera and thereby the aircraft relative to the runway, as shown at block 952. The PnP estimation is modified based on an assumption that the runway is rectangular and planar, and the PnP estimation is performed as modified to determine the current pose estimate including two degrees-of-freedom (DOF) made up of a vertical angular deviation of the aircraft from a glideslope, and a lateral angular deviation of the aircraft from a centerline of the runway.

In some further examples, the object detection and segmentation is performed at block 904 to detect the runway, and in which the mask includes the segment of pixels of the image assigned to the object class for the runway. In some of these examples, determining the current pose estimate at block 906 includes at least performing a parameterization of the mask in which a shape of the mask is described by values of at least one of a set of parameters or an interpolation of the set of parameters, as shown at block 954 of FIG. 9L. Also in some of these examples, a current pose estimate of the aircraft relative to the runway is determined based on the values of the set of parameters and an expression that maps the at least one of the set of parameters or the interpolation of the set of parameters to a pose or an interpolated pose of the aircraft relative to the runway, as shown at block 956.

In some examples, the set of parameters includes moment invariants of the mask, and performing the parameterization at block 954 includes determining values of the moment invariants of the mask.

In some examples, the current pose estimate is determined at block 956 based on the expression that is implemented as a lookup table of different values of the set of parameters and ground truth poses of the aircraft relative to the runway. In other examples, the current pose estimate is determined based on the expression that is implemented as a stochastic algorithm. And in yet other examples, the current pose estimate is determined based on the expression that is implemented as a deterministic algorithm.

In some examples, the object detection and segmentation is performed at block 904 to detect the runway, and in which the mask includes the segment of pixels of the image assigned to the object class for the runway. In some of these examples, determining the current pose estimate at block 906 includes at least determining edges of the mask that correspond to sides of the runway, and values of spatial dimensions of the edges, as shown at block 958 of FIG. 9M. Also in some of these examples, a regression analysis is performed in which a pose of the aircraft relative to the runway is expressed as a function of parameters that describe spatial dimensions of the edges, as shown at block 960. The regression analysis is performed to determine the current pose estimate of the aircraft relative to the runway from the values of the spatial dimensions of the edges.

In some further examples, performing the regression analysis at block 960 includes performing the regression analysis in which components of the pose of the aircraft are expressed as respective functions of parameters that describe the spatial dimensions of the edges. In some of these examples, the regression analysis is performed to determine values of the components and thereby the current pose estimate of the aircraft relative to the runway.

In some examples, performing the regression analysis at block 960 includes performing the regression analysis of different statistical models to determine multiple current pose estimates of the aircraft relative to the runway from the values of the spatial dimensions of the edges, as shown at block 962, Also in some of these examples, confidence intervals associated with respective ones of the multiple current pose estimates are determined, and a sensor fusion of the multiple current pose estimates is performed using the confidence intervals to determine the current pose estimate of the aircraft, relative to the runway, as shown in blocks 964 and 966.

In some examples, the object detection and segmentation is performed at block 904 to detect the runway, and in which the mask includes the segment of pixels of the image assigned to the object class for the runway. In some of these examples, determining the current pose estimate at block 906 includes at least determining edges of the mask that correspond to sides of the runway, and angular deviations of the edges from a centerline of the image, as shown at block 968 of FIG. 9N. Also in some of these examples, the current pose estimate of the aircraft, relative to the runway is determined from the edges and the angular deviations of the edges from the centerline, at shown at block 970, The current pose estimate includes two degrees-of-freedom (DOF) made up of a vertical angular deviation of the aircraft from a glideslope, and a lateral angular deviation of the aircraft from a centerline of the runway.

According to example implementations of the present disclosure, the systems 300, 400 and their respective subsystems may be implemented by various means. Means for implementing the system and its subsystems may include hardware, alone or under direction of one or more computer programs from a computer-readable storage medium.

In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

FIG. 10 illustrates an apparatus 1000 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 1002 (e.g., processor unit) connected to a memory 1004 (e.g., storage device).

The processing circuitry 1002 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1004 (of the same or another apparatus).

The processing circuitry 1002 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1004 is generally any piece of computer hardware that is capable of storing information such as, for example, data, computer programs (e.g., computer-readable program code 1006) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1004, the processing circuitry 1002 may also be connected to one or more interfaces for displaying, transmitting and/or receiving information. The interfaces may include a communications interface 1008 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1010 and/or one or more user input interfaces 1012 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1000 may include a processing circuitry 1002 and a computer-readable storage medium or memory 1004 coupled to the processing circuitry, where the processing circuitry is configured to execute computer-readable program code 1006 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for supporting an aircraft approaching a runway on an airfield, the apparatus comprising: a memory configured to store computer-readable program code; and processing circuitry configured to access the memory, and execute the computer-readable program code to cause the apparatus to at least: receive a sequence of images of the airfield, captured by at least one camera onboard the aircraft approaching the runway; and for at least one image of the sequence of images, apply the at least one image to a machine learning model trained to predict a pose of the aircraft relative to the runway, the machine learning model configured to map the at least one image to the pose based on a training set of labeled images with respective ground truth poses of the aircraft relative to the runway; and output the pose as a current pose estimate of the aircraft relative to the runway for use in at least one of monitoring the current pose estimate, generating an alert based on the current pose estimate, or guidance or control of the aircraft on a final approach.

Clause 2. The apparatus of clause 1, wherein the apparatus caused to apply the at least one image to the machine learning model includes the apparatus caused to at least: apply the at least one image to the machine learning model trained to predict a pose of the at least one camera in camera coordinates; and transform the camera coordinates for the at least one camera to corresponding runway-framed local coordinates and thereby predict the pose of the aircraft relative to the runway.

Clause 3. The apparatus of clause 1 or clause 2, wherein the at least one image and the labeled images are in a non-visible light spectrum.

Clause 4. The apparatus of any of clauses 1 to 3, wherein the labeled images are mono-channel images, the at least one image is a multi-channel image, and the processing circuitry is configured to execute the computer-readable program code to cause the apparatus to further convert the multi-channel image to a mono-channel image that is applied to the machine learning model.

Clause 5. The apparatus of any of clauses 1 to 4, wherein the processing circuitry is configured to execute the computer-readable program code to cause the apparatus to further crop the at least one image to reduce a field of view of the at least one camera, and magnify only a portion of the at least one image on which the runway is located, before the at least one image is applied to the machine learning model.

Clause 6, The apparatus of any of clauses 1 to 5, wherein the processing circuitry is configured to execute the computer-readable program code to cause the apparatus to further generate the training set of labeled images, including the apparatus caused to at least: receive earlier images of the airfield, captured by the at least one camera onboard the aircraft or a second aircraft approaching the runway, and the respective ground truth poses of the aircraft or the second aircraft relative to the runway; and label the earlier images with the respective ground truth poses of the aircraft to generate the training set of labeled images.

Clause 7. The apparatus of any of clauses 1 to 6, wherein the processing circuitry is configured to execute the computer-readable program code to cause the apparatus to further generate the training set of labeled images, including the apparatus caused to at least: execute a flight simulator configured to artificially re-create flight of the aircraft approaching the runway on the airfield; capture synthetic images of the airfield, and determine the respective ground truth poses of the aircraft relative to the runway, from the flight simulator; and label the synthetic images with the respective ground truth poses of the aircraft to generate the training set of labeled images.

Clause 8. The apparatus of any of clauses 1 to 7, wherein the apparatus caused to apply the at least one image to the machine learning model includes the apparatus caused to apply the at least one image to machine learning models trained to predict respective components of the pose of the aircraft relative to the runway, the machine learning models configured to determine values of the components and thereby the pose of the aircraft relative to the runway.

Clause 9, The apparatus of any of clauses 1 to 8, wherein the apparatus caused to apply the at least one image to the machine learning model includes the apparatus caused to apply the at least one image to machine learning models trained to predict multiple current pose estimates according to different algorithms, and the processing circuitry is configured to execute the computer-readable program code to cause the apparatus to further at least: determine confidence intervals associated with respective ones of the multiple current pose estimates; and perform a sensor fusion of the multiple current pose estimates using the confidence intervals to determine the current pose estimate of the aircraft relative to the runway.

Clause 10. A method of supporting an aircraft approaching a runway on an airfield, the method comprising: receiving a sequence of images of the airfield, captured by at least one camera onboard the aircraft approaching the runway; and for at least one image of the sequence of images, applying the at least one image to a machine learning model trained to predict a pose of the aircraft relative to the runway, the machine learning model configured to map the at least one image to the pose based on a training set of labeled images with respective ground truth poses of the aircraft relative to the runway; and outputting the pose as a current pose estimate of the aircraft relative to the runway for use in at least one of monitoring the current pose estimate, generating an alert based on the current pose estimate, or guidance or control of the aircraft on a final approach.

Clause 11. The method of clause 10, wherein applying the at least one image to the machine learning model includes: applying the at least one image to the machine learning model trained to predict a pose of the at least one camera in camera coordinates; and transforming the camera coordinates for the at least one camera to corresponding runway-framed local coordinates and thereby predict the pose of the aircraft relative to the runway.

Clause 12. The method of clause 10 or clause 11, wherein the at least one image and the labeled images are in a non-visible light spectrum.

Clause 13. The method of any of clauses 10 to 12, wherein the labeled images are mono-channel images, the at least one image is a multi-channel image, and the method further comprises converting the multi-channel image to a mono-channel image that is applied to the machine learning model.

Clause 14. The method of any of clauses 10 to 13 further comprising cropping the at least one image to reduce a field of view of the at least one camera, and magnifying only a portion of the at least one image on which the runway is located, before the at least one image is applied to the machine learning model.

Clause 15. The method of any of clauses 10 to 14 further comprising generating the training set of labeled images, including at least: receiving earlier images of the airfield, captured by the at least one camera onboard the aircraft or a second aircraft approaching the runway, and the respective ground truth poses of the aircraft or the second aircraft relative to the runway; and labeling the earlier images with the respective ground truth poses of the aircraft to generate the training set of labeled images.

Clause 16. The method of any of clauses 10 to 15 further comprising generating the training set of labeled images, including at least: executing a flight simulator configured to artificially re-create flight of the aircraft approaching the runway on the airfield; capturing synthetic images of the airfield, and determining the respective ground truth poses of the aircraft relative to the runway, from the flight simulator; and labeling the synthetic images with the respective ground truth poses of the aircraft to generate the training set of labeled images.

Clause 17. The method of any of clauses 10 to 16, wherein applying the at least one image to the machine learning model includes applying the at least one image to machine learning models trained to predict respective components of the pose of the aircraft relative to the runway, the machine learning models configured to determine values of the components and thereby the pose of the aircraft relative to the runway.

Clause 18. The method of any of clauses 10 to 17, wherein applying the at least one image to the machine learning model includes applying the at least one image to machine learning models trained to predict multiple current pose estimates according to different algorithms, and the method further comprises: determining confidence intervals associated with respective ones of the multiple current pose estimates; and performing a sensor fusion of the multiple current pose estimates using the confidence intervals to determine the current pose estimate of the aircraft relative to the runway.

Clause 19. An apparatus for supporting an aircraft approaching a runway on an airfield, the apparatus comprising: a memory configured to store computer-readable program code; and processing circuitry configured to access the memory, and execute the computer-readable program code to cause the apparatus to at least: receive a sequence of images of the airfield, captured by at least one camera onboard the aircraft approaching the runway; and for at least an image of the sequence of images, perform an object detection and segmentation in which at least one of the runway on the airfield, or a runway marking on the runway, is detected in the image, and in which a mask is produced that includes a segment of pixels of the image assigned to an object class for the runway or the runway marking; determine a current pose estimate of the aircraft relative to the runway or the runway marking based on the mask; and output the current pose estimate for use in at least one of monitoring the current pose estimate, generating an alert based on the current pose estimate, or guidance or control of the aircraft on a final approach.

Clause 20. The apparatus of clause 19, wherein the apparatus caused to determine the current pose estimate of the aircraft relative to the runway or the runway marking includes the apparatus caused to at least: determine the current pose estimate of the at least one camera in camera coordinates; and transform the camera coordinates for the at least one camera to corresponding runway-framed local coordinates that are output for use in the at least one of monitoring the current pose estimate, generating the alert based on the current pose estimate, or guidance or control of the aircraft.

Clause 21. The apparatus of clause 19 or clause 20, wherein the sequence of images are in the non-visible light spectrum.

Clause 22. The apparatus of any of clauses 19 to 21, wherein the image is a multi-channel image, and the processing circuitry is configured to execute the computer-readable program code to cause the apparatus to further convert the multi-channel image to a mono-channel image on which the object detection and segmentation is performed.

Clause 23. The apparatus of any of clauses 19 to 22, wherein the processing circuitry is configured to execute the computer-readable program code to cause the apparatus to further crop the image to reduce a field of view of the at least one camera, and magnify only a portion of the image on which the runway or the runway marking is located, before the object detection and segmentation is performed.

Clause 24. The apparatus of clause 23, wherein the processing circuitry is configured to execute the computer-readable program code to cause the apparatus to further at least: access an earlier image in the sequence of images, and an earlier mask includes a respective segment of pixels of the earlier image assigned to the object class for the runway or the runway marking; and identify a portion of the earlier image that frames the earlier mask, and thereby the portion of the airfield on which the runway or the runway marking is located, and wherein the apparatus caused to crop the image includes the apparatus caused to crop the image to a portion of the image that corresponds to the portion of the earlier image.

Clause 25. The apparatus of any of clauses 19 to 24, wherein the apparatus caused to perform the object detection and segmentation includes the apparatus caused to apply the image to a machine learning model trained to perform the object detection and segmentation.

Clause 26. The apparatus of any of clauses 19 to 25, wherein the apparatus caused to perform the object detection and segmentation includes the apparatus caused to perform a feature detection in which features of the runway or the runway marking are detected in the image, and in which the mask is produced from the features.

Clause 27. The apparatus of any of clauses 19 to 26, wherein the apparatus caused to determine the current pose estimate includes the apparatus caused to at least: apply the mask to a corner detector to detect interest points on the mask and thereby the runway or the runway marking in the image; match the interest points on the runway or the runway marking in the image, to corresponding points on the runway or the runway marking that have known runway-framed local coordinates; and perform a perspective-n-point (PnP) estimation, using the interest points and the known runway-framed local coordinates, to determine the current pose estimate of the at least one camera and thereby the aircraft relative to the runway or the runway marking.

Clause 28. The apparatus of clause 27, wherein the apparatus caused to perform the object detection and segmentation includes the apparatus caused to apply the image to a machine learning model trained to perform the object detection and segmentation, and the processing circuitry is configured to execute the computer-readable program code to cause the apparatus to further at least: determine an operational state of the aircraft; and based on the operational state, select a first machine learning model or a second machine learning model as the machine learning model to which the image is applied, the first machine learning model trained to perform a one-class object detection and segmentation, and the second machine learning model trained to perform a multi-class object detection and segmentation.

Clause 29. The apparatus of clause 27 or clause 28, wherein the apparatus caused to perform the object detection and segmentation includes the apparatus caused to apply the image to a machine learning model trained to perform the object detection and segmentation, and the machine learning model further determines a confidence interval or multi-dimensional confidence matrix associated with detection of the runway or the runway marking, and wherein the processing circuitry is configured to execute the computer-readable program code to cause the apparatus to further apply the mask to a confidence filter that passes the mask to the corner detector only when the confidence interval is above a threshold confidence interval that is dynamically set based on an operational state of the aircraft.

Clause 30. The apparatus of any of clauses 27 to 29, wherein the PnP estimation is performed to determine to multiple current pose estimates of the aircraft relative to the runway or the runway marking, and the processing circuitry is configured to execute the computer-readable program code to cause the apparatus to further at least: determine confidence intervals associated with respective ones of the multiple current pose estimates; and perform a sensor fusion of the multiple current pose estimates using the confidence intervals to determine the current pose estimate of the aircraft relative to the runway or the runway marking.

Clause 31. The apparatus of any of clauses 19 to 30, wherein the object detection and segmentation is performed to detect the runway, and in which the mask includes the segment of pixels of the image assigned to the object class for the runway, and the apparatus caused to determine the current pose estimate includes the apparatus caused to at least: apply the mask to a corner detector to detect a pair of interest points on the mask and thereby the runway in the image; match the pair of interest points on the runway in the image, to corresponding points on the runway that have known runway-framed local coordinates; and perform a perspective-n-point (PnP) estimation for n=2, using the pair of interest points and the known runway-framed local coordinates, to determine the current pose estimate of the at least one camera and thereby the aircraft relative to the runway, the PnP estimation modified based on an assumption that the runway is rectangular and planar, and wherein the PnP estimation is performed as modified to determine the current pose estimate including two degrees-of-freedom (DOE) made up of a vertical angular deviation of the aircraft from a glideslope, and a lateral angular deviation of the aircraft from a centerline of the runway.

Clause 32. The apparatus of any of clauses 19 to 31, wherein the object detection and segmentation is performed to detect the runway, and in which the mask includes the segment of pixels of the image assigned to the object class for the runway, and the apparatus caused to determine the current pose estimate includes the apparatus caused to at least: perform a parameterization of the mask in which a shape of the mask is described by values of at least one of a set of parameters or an interpolation of the set of parameters; and determine a current pose estimate of the aircraft relative to the runway, based on the values of the set of parameters and an expression that maps the at least one of the set of parameters or the interpolation of the set of parameters to a pose or an interpolated pose of the aircraft relative to the runway.

Clause 33. The apparatus of clause 32, wherein the set of parameters includes moment invariants of the mask, and the apparatus caused to perform the parameterization includes the apparatus caused to determine values of the moment invariants of the mask.

Clause 34. The apparatus of clause 32 or clause 33, wherein the current pose estimate is determined based on the expression that is implemented as a lookup table of different values of the set of parameters and ground truth poses of the aircraft relative to the runway.

Clause 35. The apparatus of any of clauses 32 to 34, wherein the current pose estimate is determined based on the expression that is implemented as a stochastic algorithm.

Clause 36. The apparatus of any of clauses 32 to 35, wherein the current pose estimate is determined based on the expression that is implemented as a deterministic algorithm.

Clause 37. The apparatus of any of clauses 19 to 36, wherein the object detection and segmentation is performed to detect the runway, and in which the mask includes the segment of pixels of the image assigned to the object class for the runway, and the apparatus caused to determine the current pose estimate includes the apparatus caused to at least: determine edges of the mask that correspond to sides of the runway, and values of spatial dimensions of the edges; and perform a regression analysis in which a pose of the aircraft relative to the runway is expressed as a function of parameters that describe spatial dimensions of the edges, the regression analysis performed to determine the current pose estimate of the aircraft relative to the runway from the values of the spatial dimensions of the edges.

Clause 38. The apparatus of clause 37, wherein the apparatus caused to perform the regression analysis includes the apparatus caused to perform the regression analysis in which components of the pose of the aircraft are expressed as respective functions of parameters that describe the spatial dimensions of the edges, the regression analysis performed to determine values of the components and thereby the current pose estimate of the aircraft relative to the runway.

Clause 39. The apparatus of clause 37 or clause 38, wherein the apparatus caused to perform the regression analysis includes the apparatus caused to at least: perform the regression analysis of different statistical models to determine multiple current pose estimates of the aircraft relative to the runway from the values of the spatial dimensions of the edges; determine confidence intervals associated with respective ones of the multiple current pose estimates; and perform a sensor fusion of the multiple current pose estimates using the confidence intervals to determine the current pose estimate of the aircraft relative to the runway.

Clause 40. The apparatus of any of clauses 19 to 39, wherein the object detection and segmentation is performed to detect the runway, and in which the mask includes the segment of pixels of the image assigned to the object class for the runway, and the apparatus caused to determine the current pose estimate includes the apparatus caused to at least: determine edges of the mask that correspond to sides of the runway, and angular deviations of the edges from a centerline of the image; and determine the current pose estimate of the aircraft relative to the runway from the edges and the angular deviations of the edges from the centerline, the current pose estimate including two degrees-of-freedom (DOF) made up of a vertical angular deviation of the aircraft from a glideslope, and a lateral angular deviation of the aircraft from a centerline of the runway.

Clause 41. A method of supporting an aircraft approaching a runway on an airfield, the method comprising: receiving a sequence of images of the airfield, captured by at least one camera onboard the aircraft approaching the runway; and for at least an image of the sequence of images, performing an object detection and segmentation in which at least one of the runway on the airfield, or a runway marking on the runway, is detected in the image, and in which a mask is produced that includes a segment of pixels of the image assigned to an object class for the runway or the runway marking; determining a current pose estimate of the aircraft relative to the runway or the runway marking based on the mask; and outputting the current pose estimate for use in at least one of monitoring the current pose estimate, generating an alert based on the current pose estimate, or guidance or control of the aircraft on a final approach.

Clause 42. The method of clause 41, wherein determining the current pose estimate of the aircraft relative to the runway or the runway marking includes at least: determining the current pose estimate of the at least one camera in camera coordinates; and transforming the camera coordinates for the at least one camera to corresponding runway-framed local coordinates that are output for use in the at least one of monitoring the current pose estimate, generating the alert based on the current pose estimate, or guidance or control of the aircraft.

Clause 43. The method of clause 41 or clause 42, wherein the sequence of images are in the non-visible light spectrum.

Clause 44. The method of any of clauses 41 to 43, wherein the image is a multi-channel image, and the method further comprises converting the multi-channel image to a mono-channel image on which the object detection and segmentation is performed.

Clause 45. The method of any of clauses 41 to 44 further comprising cropping the image to reduce a field of view of the at least one camera, and magnifying only a portion of the image on which the runway or the runway marking is located, before the object detection and segmentation is performed.

Clause 46. The method of clause 45 further comprising: accessing an earlier image in the sequence of images, and an earlier mask includes a respective segment of pixels of the earlier image assigned to the object class for the runway or the runway marking; and identifying a portion of the earlier image that frames the earlier mask, and thereby the portion of the airfield on which the runway or the runway marking is located, and wherein cropping the image includes cropping the image to a portion of the image that corresponds to the portion of the earlier image.

Clause 47. The method of any of clauses 41 to 46, wherein performing the object detection and segmentation includes applying the image to a machine learning model trained to perform the object detection and segmentation.

Clause 48. The method of any of clauses 41 to 47, wherein performing the object detection and segmentation includes performing a feature detection in which features of the runway or the runway marking are detected in the image, and in which the mask is produced from the features.

Clause 49. The method of any of clauses 41 to 48, wherein determining the current pose estimate includes at least: applying the mask to a corner detector to detect interest points on the mask and thereby the runway or the runway marking in the image; matching the interest points on the runway or the runway marking in the image, to corresponding points on the runway or the runway marking that have known runway-framed local coordinates; and performing a perspective-n-point (PnP) estimation, using the interest points and the known runway-framed local coordinates, to determine the current pose estimate of the at least one camera and thereby the aircraft relative to the runway or the runway marking.

Clause 50. The method of clause 49, wherein performing the object detection and segmentation includes applying the image to a machine learning model trained to perform the object detection and segmentation, and the method further comprises: determining an operational state of the aircraft; and based on the operational state, selecting a first machine learning model or a second machine learning model as the machine learning model to which the image is applied, the first machine learning model trained to perform a one-class object detection and segmentation, and the second machine learning model trained to perform a multi-class object detection and segmentation.

Clause 51. The method of clause 49 or clause 50, wherein performing the object detection and segmentation includes applying the image to a machine learning model trained to perform the object detection and segmentation, and the machine learning model further determines a confidence interval or multi-dimensional confidence matrix associated with detection of the runway or the runway marking, and wherein the method further comprises applying the mask to a confidence filter that passes the mask to the corner detector only when the confidence interval is above a threshold confidence interval that is dynamically set based on an operational state of the aircraft.

Clause 52. The method of any of clauses 49 to 51, wherein the PnP estimation is performed to determine to multiple current pose estimates of the aircraft relative to the runway or the runway marking, and the method further comprises: determining confidence intervals associated with respective ones of the multiple current pose estimates; and performing a sensor fusion of the multiple current pose estimates using the confidence intervals to determine the current pose estimate of the aircraft relative to the runway or the runway marking.

Clause 53. The method of any of clauses 41 to 52, wherein the object detection and segmentation is performed to detect the runway, and in which the mask includes the segment of pixels of the image assigned to the object class for the runway, and determining the current pose estimate includes at least: applying the mask to a corner detector to detect a pair of interest points on the mask and thereby the runway in the image; matching the pair of interest points on the runway in the image, to corresponding points on the runway that have known runway-framed local coordinates; and performing a perspective-n-point (PnP) estimation for n=2, using the pair of interest points and the known runway-framed local coordinates, to determine the current pose estimate of the at least one camera and thereby the aircraft relative to the runway, the PnP estimation modified based on an assumption that the runway is rectangular and planar, and wherein the PnP estimation is performed as modified to determine the current pose estimate including two degrees-of-freedom (DOI) made up of a vertical angular deviation of the aircraft from a glideslope, and a lateral angular deviation of the aircraft from a centerline of the runway.

Clause 54. The method of any of clauses 41 to 53, wherein the object detection and segmentation is performed to detect the runway, and in which the mask includes the segment of pixels of the image assigned to the object class for the runway, and determining the current pose estimate includes at least: performing a parameterization of the mask in which a shape of the mask is described by values of at least one of a set of parameters or an interpolation of the set of parameters; and determining a current pose estimate of the aircraft relative to the runway based on the values of the set of parameters and an expression that maps the at least one of the set of parameters or the interpolation of the set of parameters to a pose or an interpolated pose of the aircraft relative to the runway.

Clause 55. The method of clause 54, wherein the set of parameters includes moment invariants of the mask, and performing the parameterization includes determining values of the moment invariants of the mask.

Clause 56. The method of clause 54 or clause 55, wherein the current pose estimate is determined based on the expression that is implemented as a lookup table of different values of the set of parameters and ground truth poses of the aircraft relative to the runway.

Clause 57. The method of any of clauses 54 to 56, wherein the current pose estimate is determined based on the expression that is implemented as a stochastic algorithm.

Clause 58. The method of any of clauses 54 to 57, wherein the current pose estimate is determined based on the expression that is implemented as a deterministic algorithm.

Clause 59. The method of any of clauses 41 to 58, wherein the object detection and segmentation is performed to detect the runway; and in which the mask includes the segment of pixels of the image assigned to the object class for the runway, and determining the current pose estimate includes at least: determining edges of the mask that correspond to sides of the runway, and values of spatial dimensions of the edges; and performing a regression analysis in which a pose of the aircraft relative to the runway is expressed as a function of parameters that describe spatial dimensions of the edges, the regression analysis performed to determine the current pose estimate of the aircraft relative to the runway from the values of the spatial dimensions of the edges.

Clause 60. The method of clause 59, wherein performing the regression analysis includes performing the regression analysis in which components of the pose of the aircraft are expressed as respective functions of parameters that describe the spatial dimensions of the edges, the regression analysis performed to determine values of the components and thereby the current pose estimate of the aircraft relative to the runway.

Clause 61. The method of clause 59 or clause 60, wherein performing the regression analysis includes: performing the regression analysis of different statistical models to determine multiple current pose estimates of the aircraft relative to the runway from the values of the spatial dimensions of the edges; determining confidence intervals associated with respective ones of the multiple current pose estimates; and performing a sensor fusion of the multiple current pose estimates using the confidence intervals to determine the current pose estimate of the aircraft relative to the runway.

Clause 62. The method of any of clauses 41 to 61, wherein the object detection and segmentation is performed to detect the runway, and in which the mask includes the segment of pixels of the image assigned to the object class for the runway, and determining the current pose estimate includes at least: determining edges of the mask that correspond to sides of the runway, and angular deviations of the edges from a centerline of the image; and determining the current pose estimate of the aircraft relative to the runway from the edges and the angular deviations of the edges from the centerline, the current pose estimate including two degrees-of-freedom (DOF) made up of a vertical angular deviation of the aircraft from a glideslope, and a lateral angular deviation of the aircraft from a centerline of the runway.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions; it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for supporting an aircraft approaching a runway on an airfield, the apparatus comprising:
  a memory configured to store computer-readable program code; and
  processing circuitry configured to access the memory, and execute the computer-readable program code to cause the apparatus to at least:
  receive a sequence of images of the airfield, captured by at least one camera onboard the aircraft approaching the runway; and for at least one image of the sequence of images,
  apply the at least one image to a machine learning model trained to predict a pose of the aircraft relative to the runway, the machine learning model configured to map the at least one image to the pose based on a training set of labeled images with respective ground truth poses of the aircraft relative to the runway; and
  output the pose as a current pose estimate of the aircraft relative to the runway for use in at least one of monitoring the current pose estimate, generating an alert based on the current pose estimate, or guidance or control of the aircraft on a final approach.

2. The apparatus of claim 1, wherein the apparatus caused to apply the at least one image to the machine learning model includes the apparatus caused to at least:
  apply the at least one image to the machine learning model trained to predict a pose of the at least one camera in camera coordinates; and
  transform the camera coordinates for the at least one camera to corresponding runway-framed local coordinates and thereby predict the pose of the aircraft relative to the runway.

3. The apparatus of claim 1, wherein the at least one image and the labeled images are in a non-visible light spectrum.

4. The apparatus of claim 1, wherein the labeled images are mono-channel images, the at least one image is a multi-channel image, and the processing circuitry is configured to execute the computer-readable program code to cause the apparatus to further convert the multi-channel image to a mono-channel image that is applied to the machine learning model.

5. The apparatus of claim 1, wherein the processing circuitry is configured to execute the computer-readable program code to cause the apparatus to further crop the at least one image to reduce a field of view of the at least one camera, and magnify only a portion of the at least one image on which the runway is located, before the at least one image is applied to the machine learning model.

6. The apparatus of claim 1, wherein the processing circuitry is configured to execute the computer-readable program code to cause the apparatus to further generate the training set of labeled images, including the apparatus caused to at least:
 receive earlier images of the airfield, captured by the at least one camera onboard the aircraft or a second aircraft approaching the runway, and the respective ground truth poses of the aircraft or the second aircraft relative to the runway; and
 label the earlier images with the respective ground truth poses of the aircraft to generate the training set of labeled images.

7. The apparatus of claim 1, wherein the processing circuitry is configured to execute the computer-readable program code to cause the apparatus to further generate the training set of labeled images, including the apparatus caused to at least:
 execute a flight simulator configured to artificially re-create flight of the aircraft approaching the runway on the airfield;
 capture synthetic images of the airfield, and determine the respective ground truth poses of the aircraft relative to the runway, from the flight simulator; and
 label the synthetic images with the respective ground truth poses of the aircraft to generate the training set of labeled images.

8. The apparatus of claim 1, wherein the apparatus caused to apply the at least one image to the machine learning model includes the apparatus caused to apply the at least one image to machine learning models trained to predict respective components of the pose of the aircraft relative to the runway, the machine learning models configured to determine values of the components and thereby the pose of the aircraft relative to the runway.

9. The apparatus of claim 1, wherein the apparatus caused to apply the at least one image to the machine learning model includes the apparatus caused to apply the at least one image to machine learning models trained to predict multiple current pose estimates according to different algorithms, and the processing circuitry is configured to execute the computer-readable program code to cause the apparatus to further at least:
 determine confidence intervals associated with respective ones of the multiple current pose estimates; and
 perform a sensor fusion of the multiple current pose estimates using the confidence intervals to determine the current pose estimate of the aircraft relative to the runway.

10. The apparatus of claim 1, wherein the at least one camera is located onboard the aircraft in a configuration that allows the at least one camera to capture a view of the environment ahead of the aircraft in a direction of travel of the aircraft.

11. A method of supporting an aircraft approaching a runway on an airfield, the method comprising:
 receiving a sequence of images of the airfield, captured by at least one camera onboard the aircraft approaching the runway; and for at least one image of the sequence of images,
 applying the at least one image to a machine learning model trained to predict a pose of the aircraft relative to the runway, the machine learning model configured to map the at least one image to the pose based on a training set of labeled images with respective ground truth poses of the aircraft relative to the runway; and
 outputting the pose as a current pose estimate of the aircraft relative to the runway for use in at least one of monitoring the current pose estimate, generating an alert based on the current pose estimate, or guidance or control of the aircraft on a final approach.

12. The method of claim 11, wherein applying the at least one image to the machine learning model includes:
 applying the at least one image to the machine learning model trained to predict a pose of the at least one camera in camera coordinates; and
 transforming the camera coordinates for the at least one camera to corresponding runway-framed local coordinates and thereby predict the pose of the aircraft relative to the runway.

13. The method of claim 11, wherein the at least one image and the labeled images are in a non-visible light spectrum.

14. The method of claim 11, wherein the labeled images are mono-channel images, the at least one image is a multi-channel image, and the method further comprises converting the multi-channel image to a mono-channel image that is applied to the machine learning model.

15. The method of claim 11 further comprising cropping the at least one image to reduce a field of view of the at least one camera, and magnifying only a portion of the at least one image on which the runway is located, before the at least one image is applied to the machine learning model.

16. The method of claim 11 further comprising generating the training set of labeled images, including at least:
 receiving earlier images of the airfield, captured by the at least one camera onboard the aircraft or a second aircraft approaching the runway, and the respective ground truth poses of the aircraft or the second aircraft relative to the runway; and
 labeling the earlier images with the respective ground truth poses of the aircraft to generate the training set of labeled images.

17. The method of claim 11 further comprising generating the training set of labeled images, including at least:
 executing a flight simulator configured to artificially re-create flight of the aircraft approaching the runway on the airfield;
 capturing synthetic images of the airfield, and determining the respective ground truth poses of the aircraft relative to the runway, from the flight simulator; and
 labeling the synthetic images with the respective ground truth poses of the aircraft to generate the training set of labeled images.

18. The method of claim 11, wherein applying the at least one image to the machine learning model includes applying the at least one image to machine learning models trained to predict respective components of the pose of the aircraft relative to the runway, the machine learning models configured to determine values of the components and thereby the pose of the aircraft relative to the runway.

19. The method of claim 11, wherein applying the at least one image to the machine learning model includes applying the at least one image to machine learning models trained to predict multiple current pose estimates according to different algorithms, and the method further comprises:
 determining confidence intervals associated with respective ones of the multiple current pose estimates; and performing a sensor fusion of the multiple current pose estimates using the confidence intervals to determine the current pose estimate of the aircraft relative to the runway.

20. The method of claim 11, wherein the at least one camera is located onboard the aircraft in a configuration that allows the at least one camera to capture a view of the environment ahead of the aircraft in a direction of travel of the aircraft.

* * * * *